(12) United States Patent
Clarke et al.

(10) Patent No.: US 12,258,171 B2
(45) Date of Patent: Mar. 25, 2025

(54) CONTAINER AND MANUFACTURE THEREOF

(71) Applicant: Bockatech Ltd., Cambridgeshire (GB)

(72) Inventors: Peter Reginald Clarke, Cambridgeshire (GB); Chris Bocking, Cambridgeshire (GB)

(73) Assignee: Bockatech Ltd., Cambridgeshire (GB)

( * ) Notice: Subject to any disclaimer, the term of this patent is extended or adjusted under 35 U.S.C. 154(b) by 0 days.

(21) Appl. No.: 17/928,654

(22) PCT Filed: Jul. 16, 2021

(86) PCT No.: PCT/EP2021/070043
§ 371 (c)(1),
(2) Date: Nov. 30, 2022

(87) PCT Pub. No.: WO2022/017987
PCT Pub. Date: Jan. 27, 2022

(65) Prior Publication Data
US 2023/0294333 A1   Sep. 21, 2023

(30) Foreign Application Priority Data

Jul. 22, 2020  (GB) ........................... 2011345
Nov. 11, 2020  (GB) ........................... 2017812
Nov. 11, 2020  (GB) ........................... 2017813

(51) Int. Cl.
*B65D 1/34*   (2006.01)
*B29C 33/00*  (2006.01)
(Continued)

(52) U.S. Cl.
CPC ............ *B65D 1/34* (2013.01); *B29C 33/0033* (2013.01); *B29C 44/18* (2013.01);
(Continued)

(58) Field of Classification Search
CPC . B65D 1/34; B65D 1/265; B65D 1/36; B65D 1/40; B65D 1/42; B65D 5/2038;
(Continued)

(56) References Cited

U.S. PATENT DOCUMENTS 4,001,471 A * 1/1977 Rumball ................ B65D 5/209
428/81
10,736,468 B2 * 8/2020 Herlin .................... B65D 15/08
(Continued)

FOREIGN PATENT DOCUMENTS

EP   2236264 A1   10/2010
EP   3241658 A1   11/2017
(Continued)

OTHER PUBLICATIONS

Combined Search and Examination Report Under Sections 17 and 18(3) in related GB application 2017812.5 issued on Apr. 13, 2021.
(Continued)

*Primary Examiner* — Christopher R Demeree
(74) *Attorney, Agent, or Firm* — POLSINELLI PC

(57) ABSTRACT

A container having an annular sidewall with upper and lower annular peripheral edges and a lattice structure of elongate ribs interconnecting the upper and lower annular peripheral edges, wherein the lattice structure is an open framework defining a plurality of sidewall openings, and a base having an annular peripheral edge which is integral with the lower annular peripheral edge of the sidewall, the annular peripheral edge of the base surrounding a base wall structure which is integral therewith, the base wall structure having at least one injection moulding sprue at a central region of the base wall structure, wherein the at least one injection moulding sprue is connected to the upper annular peripheral edge of the annular sidewall by the base wall structure, the annular peripheral edge of the base, the lower annular peripheral
(Continued)

edge of the sidewall and the lattice structure of the sidewall, wherein the sidewall and the base are composed of a thermoplastic polymer and define a central concavity for packaging a product, and wherein the container further has a flexible sheet which is bonded to the lattice structure to cover the sidewall openings and form a sealed sidewall surface of the container.

26 Claims, 10 Drawing Sheets

(51) Int. Cl.
    *B29C 44/18*     (2006.01)
    *B29C 44/42*     (2006.01)
    *B29C 44/58*     (2006.01)
    *B29C 45/00*     (2006.01)
    *B29C 45/14*     (2006.01)
    *B29C 45/17*     (2006.01)
    *B29C 45/37*     (2006.01)
    *B29K 101/12*     (2006.01)
    *B29K 105/04*     (2006.01)
    *B29L 31/00*     (2006.01)
    *B65D 1/26*     (2006.01)
    *B65D 1/36*     (2006.01)
    *B65D 1/40*     (2006.01)
    *B65D 1/42*     (2006.01)
    *B65D 5/20*     (2006.01)
    *B65D 5/66*     (2006.01)
    *B65D 65/46*     (2006.01)

(52) U.S. Cl.
    CPC .... *B29C 45/0081* (2013.01); *B29C 45/14336* (2013.01); *B29C 45/1704* (2013.01); *B29C 45/1706* (2013.01); *B29C 45/37* (2013.01); *B65D 1/265* (2013.01); *B65D 1/36* (2013.01); *B65D 1/40* (2013.01); *B65D 1/42* (2013.01); *B65D 5/2038* (2013.01); *B65D 5/66* (2013.01); *B65D 65/466* (2013.01); *B29C 44/428* (2013.01); *B29C 44/583* (2013.01); *B29K 2101/12* (2013.01); *B29K 2105/04* (2013.01); *B29L 2031/712* (2013.01); *B29L 2031/7132* (2013.01); *B29L 2031/737* (2013.01)

(58) Field of Classification Search
    CPC ........ B65D 5/66; B65D 65/466; B65D 15/08; B65D 2543/00101; B65D 3/28; B29C 45/14475; B29C 45/14336
    USPC .......................... 264/299; 206/524.6; 428/81
    See application file for complete search history.

(56) References Cited

U.S. PATENT DOCUMENTS

| | | | |
|---|---|---|---|
| 2014/0353202 A1* | 12/2014 | Park | B65D 15/08 206/524.6 |
| 2023/0192352 A1* | 6/2023 | Rosell | B29C 45/2708 229/104 |
| 2023/0399140 A1* | 12/2023 | Lundgren-Goodman | B65D 3/10 |

FOREIGN PATENT DOCUMENTS

| | | |
|---|---|---|
| JP | 2007022556 A | 2/2007 |
| WO | 199723334 | 7/1997 |
| WO | 2017134181 A1 | 8/2017 |

OTHER PUBLICATIONS

International Search Report and Written Opinion in related international application PCT/EP2021/070043 issued on Jan. 21, 2022.
International Preliminary Report on Patentability in related international application PCT/EP2021/070043 issued on Jan. 24, 2023.

* cited by examiner

CONTAINER AND MANUFACTURE THEREOF

FIELD OF THE INVENTION

The present invention relates to the manufacture of thermoplastic polymer containers, e.g. containers for foodstuffs and/or beverages.

BACKGROUND

In the packaging industry, there is a general need to make disposable packaging of recyclable material. Preferably, the packaging is made of a single recyclable material, such as PET or a polyolefin. There is also a general need to reduce the mass of thermoplastic material used for any given packaging article. The reduced mass not only reduces the cost of manufacturing the packaging article, but also reduces the volume of material to be recycled.

Efforts have been made in the industry to provide various disposable packaging articles. For example, WO-A-2017/134181, WO-A-2019/025274 and WO-A-2020/048912 disclose the manufacture of a lightweight polypropylene cup which has expanded regions comprising a cellular foam.

SUMMARY OF THE INVENTION

However, despite this prior art disclosure there is still a need to produce thermoplastic containers, in particular containers for foodstuffs and/or beverages, which have even smaller wall thickness and even lower mass, yet high stiffness, as well as low cost. Typically, containers for foodstuffs and/or beverages are required to have a desired precise geometrical shape, yet nevertheless have high wall strength, and preferably are readily recyclable, most preferably being composed of a single recyclable material.

The present invention aims at least partially to overcome the problem of achieving even smaller wall thickness and even lower mass, a desired precise geometrical shape, yet nevertheless high stiffness and wall strength, in containers for foodstuffs and/or beverages, which preferably are composed of a single recyclable material.

The present invention provides a container comprising an annular sidewall which comprises upper and lower annular peripheral edges and a lattice structure of elongate ribs interconnecting the upper and lower annular peripheral edges, wherein the lattice structure is an open framework defining a plurality of sidewall openings, and a base which comprises an annular peripheral edge which is integral with the lower annular peripheral edge of the sidewall, the annular peripheral edge of the base surrounding a base wall structure which is integral therewith, the base wall structure comprising at least one injection moulding sprue at a central region of the base wall structure, wherein the at least one injection moulding sprue is connected to the upper annular peripheral edge of the annular sidewall by the base wall structure, the annular peripheral edge of the base, the lower annular peripheral edge of the sidewall and the lattice structure of the sidewall, wherein the sidewall and the base are composed of a thermoplastic polymer and define a central concavity for packaging a product, and wherein the container further comprises a flexible sheet which is bonded to the lattice structure to cover the sidewall openings and form a sealed sidewall surface of the container.

The present invention further provides a method of forming a container method of forming a container, the method comprising the steps of:

(a) providing a mould having a first mould part and a second mould part, the first and second mould parts having respective first and second cavity-forming surfaces for forming a sidewall and base of the container which define a central concavity for packaging a product in the container, wherein the first and second cavity-forming surfaces have respective first and second regions for moulding a sidewall of a container;

(b) providing an in-mould flexible sheet between the first and second regions;

(c) closing the mould thereby defining a cavity between the first and second cavity-forming surfaces, wherein the cavity defines an annular sidewall-forming portion and a base-forming portion which is adjacent to the sidewall-forming portion, wherein the first region of the first cavity-forming surface comprises a lattice-forming portion, comprising a latticed network of concavities in the first cavity-forming surface, the flexible sheet being located within the cavity adjacent to the lattice-forming portion of the first cavity-forming surface or adjacent to the second cavity-forming surface at a location opposite the lattice-forming portion of the first cavity-forming surface, wherein a plurality of opening-forming portions of the mould are provided adjacent to the concavities, and in the opening-forming portions of the mould the flexible sheet is held between the first and second cavity-forming surfaces;

(d) injecting a molten plastic composition comprising a thermoplastic polymer into the mould whereby in at least the latticed network of concavities is injected a lattice-forming part of the thermoplastic polymer, wherein the lattice-forming part defines a lattice structure of elongate ribs interconnecting upper and lower annular peripheral edges of an annular sidewall of the container, wherein the lattice structure is an open framework defining a plurality of sidewall openings formed by the plurality of opening-forming portions of the mould, and the base-forming portion forms a base which comprises an annular peripheral edge which is integral with the lower annular peripheral edge of the sidewall, the annular peripheral edge of the base surrounding a base wall structure which is integral therewith, the base wall structure comprising at least one injection moulding sprue at a central region of the base wall structure through which the molten plastic composition is injected into the cavity, wherein the at least one injection moulding sprue is connected to the upper annular peripheral edge of the annular sidewall by the base wall structure, the annular peripheral edge of the base, the lower annular peripheral edge of the sidewall and the lattice structure of the sidewall;

(e) cooling the molten plastic composition to solidify the thermoplastic polymer and bond the flexible sheet to the lattice structure to cover the sidewall openings and form a sealed sidewall surface of the container; and (f) opening the mould and removing the container from the mould.

According to one embodiment, a container is provided comprising:

an annular sidewall which comprises upper and lower annular peripheral edges and a lattice structure of elongate ribs interconnecting the upper and lower annular peripheral edges, wherein the lattice structure is an open framework defining a plurality of sidewall openings, and a base which comprises an annular peripheral edge which is integral with the lower annular peripheral edge of the sidewall, the annular peripheral edge of the base surrounding a base wall structure which is integral therewith, the base wall structure comprising at least one injection moulding sprue at a central region of the base wall structure, wherein the at least one injection moulding sprue is connected to the upper annular peripheral edge of the annular sidewall by the base wall structure, the annular peripheral edge of the base, the lower annular peripheral edge of the sidewall and the lattice structure of the sidewall, wherein the sidewall and the base are composed of a thermoplastic polymer and define a central concavity for packaging a product, and wherein the container further comprises a flexible sheet which is bonded to the lattice structure to cover the sidewall openings and form a sealed sidewall surface of the container.

According to one embodiment, the flexible sheet is bonded to an inner surface of the lattice structure and an inner surface of the flexible sheet forms the interior surface of the sidewall or wherein the flexible sheet is bonded to an outer surface of the lattice structure and the inner surface of the lattice structure and exposed regions of the inner surface of the flexible sheet within the sidewall openings form the interior surface of the sidewall.

According to one embodiment, the flexible sheet is an elongate strip which extends circumferentially around the sidewall and has opposite ends which form a sealed joint extending between the upper and lower annular peripheral edges.

According to one embodiment, the opposite ends are adjacent and are sealingly bonded to the lattice structure to form the sealed joint, or overlap and are sealingly bonded to each other to form the sealed joint.

According to one embodiment, the flexible sheet is additionally bonded to a surface of the base.

According to one embodiment, the flexible sheet is a single flexible sheet which covers the base and extends upwardly to cover the sidewall openings.

According to one embodiment, the base wall structure comprises a base lattice structure of elongate ribs connected to the annular peripheral edge of the base, wherein the base lattice structure is an open framework defining a plurality of base openings, and wherein the flexible sheet is bonded to the base lattice structure to cover the base openings and form a sealed base surface of the container.

According to one embodiment, each opening is covered by a respective portion of the flexible sheet, each portion being slack and thereby not under tension.

According to one embodiment, the flexible sheet has an outer peripheral edge which is sealed within the thickness of the sidewall or base.

According to one embodiment, the sidewall has a rotational shape in plan and comprises a single continuously curved endless wall member extending upwardly from the base, and the flexible sheet is elongate and extends around the sidewall, wherein elongate ribs in the sidewall extend upwardly along the sidewall and are serially located in a mutually spaced configuration around a circumference of the single continuously curved endless wall member.

According to one embodiment, the sidewall has a polygonal shape in plan and comprises a plurality of wall elements which are connected in series to form an endless wall member extending upwardly from the base, wherein elongate ribs in the sidewall extend upwardly along the sidewall and in a plurality of the wall elements a plurality of the elongate ribs are serially located in a mutually spaced configuration along a width of the wall element, and the flexible sheet comprises a central part which covers the base and a plurality of extending parts which extend away from the central part, each extending part covering a respective wall element.

According to one embodiment, at least two of the wall elements are connected at a respective corner portion of the sidewall which extends upwardly from the base, the corner portion having opposite upwardly oriented edges, and each of the opposite upwardly oriented edges has bonded thereto a peripheral side edge of a respective opposite extending part of the flexible sheet.

According to one embodiment, at the respective corner portion the peripheral side edges of the opposite extending parts of the flexible sheet are spaced from each other by a spacing extending along the corner portion.

According to one embodiment, the container further comprises a lid which is composed of a thermoplastic polymer and is removably fittable to the sidewall, wherein the flexible sheet comprises an integral extension part which is connected to a sidewall-covering portion of the flexible sheet which is bonded to the sidewall and extends away therefrom to form a lid portion of the flexible sheet which is bonded to the lid.

According to one embodiment, the integral extension part forms a hinge for the lid and/or a tamper evident connection between the lid and the sidewall.

According to one embodiment, the lid comprises a lid lattice structure of elongate ribs integrally connected to an annular peripheral edge of the lid, wherein the lid lattice structure is an open framework defining a plurality of lid openings, and wherein the flexible sheet is bonded to the lid lattice structure to cover the lid openings and form a sealed lid surface of the container.

According to one embodiment, the flexible sheet is composed of a thermoplastic polymer film comprising a single polymer layer, optionally wherein the single polymer layer comprises an oriented polymer film or a heat-shrunk polymer film, a multilayer laminate, optionally wherein the multilayer laminate comprises a barrier layer comprising a metal or polymer, a woven or non-woven thermoplastic polymer fabric, optionally which is porous to air, or a foamed thermoplastic polymer layer comprising opposed unfoamed solid skins of the thermoplastic polymer on opposite sides of a central cellular foam core of the thermoplastic polymer.

According to one embodiment, at least one or both of an outer surface and an inner surface of the flexible sheet is printed and/or embossed.

According to one embodiment, in the lattice structure in the sidewall at least some of the elongate ribs extend between the upper and lower annular peripheral edges of the sidewall.

According to one embodiment, in the lattice structure in the sidewall at least some of the elongate ribs extending between the upper and lower annular peripheral edges of the sidewall are located between upwardly oriented corners of the sidewall.

According to one embodiment, in the lattice structure in the sidewall at least some of the elongate ribs extend in a circumferential direction around at least a fraction of the annular periphery of the sidewall.

According to one embodiment, in at least one of lattice structures in the base or the lid at least some of the elongate ribs extend radially outwardly from a centre of the base or lid respectively.

According to one embodiment, in at least one of lattice structures in the sidewall, the base or the lid at least some of the elongate ribs intersect with one or more other of the elongate ribs at rib junctions to form an intersecting rib network.

According to one embodiment, in at least one of lattice structures in the sidewall, the base or the lid at least some of the elongate ribs comprise elongate foam ribs, wherein each foam rib comprises opposed outer and inner unfoamed solid skins of the thermoplastic polymer on opposite sides of a central cellular foam core of the thermoplastic polymer.

According to one embodiment, in each foam rib the outer unfoamed solid skin of the thermoplastic polymer comprises a convexly curved surface.

According to one embodiment, the convexly curved surface is continuously convexly curved between opposite elongate longitudinal edges of the elongate foam rib.

According to one embodiment, the or each lattice structure is polygonal and the openings between the ribs are polygonal, optionally wherein the lattice structure is rectangular and the openings between the ribs are rectangular or triangular.

According to one embodiment, the flexible sheet comprises holes which are aligned with the openings in the, at least one of, or each lattice structure to provide air passage or drainage holes in the sidewall, base or lid.

According to one embodiment, the container further comprises an upper annular peripheral rim which is integral with the upper annular peripheral edge of the sidewall and comprises or consists of an unfoamed layer of the thermoplastic polymer.

According to one embodiment, the upper annular peripheral rim comprises an annular edge of unfoamed thermoplastic polymer reinforced by an integral annular foam hoop reinforcement, wherein the foam hoop reinforcement comprises opposed unfoamed solid skins of the thermoplastic polymer on opposite sides of a central cellular foam core of the thermoplastic polymer.

According to one embodiment, a method of forming a container is provided comprising:
  (a) providing a mould having a first mould part and a second mould part, the first and second mould parts having respective first and second cavity-forming surfaces for forming a sidewall and base of the container which define a central concavity for packaging a product in the container, wherein the first and second cavity-forming surfaces have respective first and second regions for moulding a sidewall of a container;
  (b) providing an in-mould flexible sheet between the first and second regions;
  (c) closing the mould thereby defining a cavity between the first and second cavity-forming surfaces, wherein the cavity defines an annular sidewall-forming portion and a base-forming portion which is adjacent to the sidewall-forming portion, wherein the first region of the first cavity-forming surface comprises a lattice-forming portion, comprising a latticed network of concavities in the first cavity-forming surface, the flexible sheet being located within the cavity adjacent to the lattice-forming portion of the first cavity-forming surface or adjacent to the second cavity-forming surface at a location opposite the lattice-forming portion of the first cavity-forming surface, wherein a plurality of opening-forming portions of the mould are provided adjacent to the concavities, and in the opening-forming portions of the mould the flexible sheet is held between the first and second cavity-forming surfaces;
  (d) injecting a molten plastic composition comprising a thermoplastic polymer into the mould whereby in at least the latticed network of concavities is injected a lattice-forming part of the thermoplastic polymer, wherein the lattice-forming part defines a lattice structure of elongate ribs interconnecting upper and lower annular peripheral edges of an annular sidewall of the container, wherein the lattice structure is an open framework defining a plurality of sidewall openings formed by the plurality of opening-forming portions of the mould, and the base-forming portion forms a base which comprises an annular peripheral edge which is integral with the lower annular peripheral edge of the sidewall, the annular peripheral edge of the base surrounding a base wall structure which is integral therewith, the base wall structure comprising at least one injection moulding sprue at a central region of the base wall structure through which the molten plastic composition is injected into the cavity, wherein the at least one injection moulding sprue is connected to the upper annular peripheral edge of the annular sidewall by the base wall structure, the annular peripheral edge of the base, the lower annular peripheral edge of the sidewall and the lattice structure of the sidewall;
  (e) cooling the molten plastic composition to solidify the thermoplastic polymer and bond the flexible sheet to the lattice structure to cover the sidewall openings and form a sealed sidewall surface of the container; and
  (f) opening the mould and removing the container from the mould.

According to one embodiment, in step (c) the flexible sheet is located adjacent to an outer mould part of the first and second mould parts which forms an outer surface of the container, and after step (e) the flexible sheet is bonded to an outer surface of the lattice structure and the inner surface of the lattice structure and exposed regions of the inner surface of the flexible sheet within the sidewall openings form an interior surface of the sidewall, or wherein in step (c) the flexible sheet is located adjacent to an inner mould part of the first and second mould parts which forms an inner surface of the container, and after step (e) the flexible sheet is bonded to an inner surface of the lattice structure and an inner surface of the flexible sheet forms the interior surface of the sidewall.

According to one embodiment, the flexible sheet is an elongate strip and in step (c) the flexible sheet is located so as to extends circumferentially around the sidewall-forming portion and after step (e) opposite ends of the elongate strip form a sealed joint extending between the upper and lower annular peripheral edges.

According to one embodiment, the opposite ends are adjacent and are sealingly bonded to the lattice structure to form the sealed joint, or overlap and are sealingly bonded to each other to form the sealed joint.

According to one embodiment, in step (c) the in-mould flexible sheet is located in the base-forming portion of the cavity, and after step (e) the flexible sheet is additionally bonded to a surface of the base.

According to one embodiment, the flexible sheet is a single flexible sheet which covers the base of the container and extends upwardly to cover the sidewall openings of the container.

According to one embodiment, a base region of the first cavity-forming surface comprises a base lattice-forming portion, comprising a base latticed network of base concavities in the first cavity-forming surface;
  in step (c) the flexible sheet is located within the cavity adjacent to the base lattice-forming portion of the first cavity-forming surface or adjacent to the second cavity-forming surface at a location opposite the base lattice-forming portion of the first cavity-forming surface, wherein a plurality of base opening-forming portions of the mould are provided adjacent to the base concavities, and in the base opening-forming portions of the mould the flexible sheet is held between the first and second cavity-forming surfaces;

in step (d) a base lattice-forming part of the molten plastic composition is injected into the base latticed network of base concavities, wherein the base lattice-forming part defines a base lattice structure of elongate ribs connected to the annular peripheral edge of the base, wherein the base lattice structure is an open framework defining a plurality of base openings; and after step (e) the flexible sheet is bonded to the base lattice structure to cover the base openings and form a sealed base surface of the container.

According to one embodiment, after step (e) each opening in at least the sidewall is covered by a respective portion of the flexible sheet, each portion being slack and thereby not under tension.

According to one embodiment, after step (e) the flexible sheet is heat-shrunk in a heat shrinking step (g) whereby each portion of the heat-shrunk flexible sheet is under tension.

According to one embodiment, after step (e) the flexible sheet has an outer peripheral edge which is sealed within the thickness of the sidewall or base.

According to one embodiment, the sidewall has a rotational shape in plan and comprises a single continuously curved endless wall member extending upwardly from the base, wherein elongate ribs in the sidewall extend upwardly along the sidewall and are serially located in a mutually spaced configuration around a circumference of the single continuously curved endless wall member, and the flexible sheet is elongate and extends around the sidewall.

According to one embodiment, the sidewall has a polygonal shape in plan and comprises a plurality of wall elements which are connected in series to form an endless wall member extending upwardly from the base, wherein elongate ribs in the sidewall extend upwardly along the sidewall and in a plurality of the wall elements a plurality of the elongate ribs are serially located in a mutually spaced configuration along a width of the wall element, and the flexible sheet comprises a central part which covers the base and a plurality of extending parts which extend away from the central part, each extending part covering a respective wall element.

According to one embodiment, at least two of the wall elements are connected at a respective corner portion of the sidewall which extends upwardly from the base, the corner portion having opposite upwardly oriented edges, and each of the opposite upwardly oriented edges has bonded thereto a peripheral side edge of a respective opposite extending part.

According to one embodiment, at the respective corner portion the peripheral side edges of the opposite extending parts are spaced from each other by a spacing extending along the corner portion.

According to one embodiment, the mould further comprises third and fourth cavity-forming surfaces defining a lid-forming cavity for forming a lid of the container, in step (c) the in-mould flexible sheet extends into the lid-forming cavity, and in step (d) the molten plastic composition is injected into the lid-forming cavity to form a lid composed of the thermoplastic polymer, whereby after step (e) the lid is removably fittable to the sidewall, and the flexible sheet comprises an integral extension part which is connected to a sidewall-covering portion of the flexible sheet which is bonded to the sidewall and extends away therefrom to form a lid portion of the flexible sheet which is bonded to the lid.

According to one embodiment, the integral extension part forms a hinge for the lid and/or a tamper evident connection between the lid and the sidewall.

According to one embodiment, the lid comprises a lid lattice structure of elongate ribs connected to an annular peripheral edge of the lid, wherein the lid lattice structure is an open framework defining a plurality of lid openings, and wherein the flexible sheet is bonded to the lid lattice structure to cover the lid openings and form a sealed lid surface of the container.

According to one embodiment, the flexible sheet comprises holes which are aligned with the openings in the, at least one of, or each lattice structure to provide air passage or drainage holes in the sidewall, base or lid.

According to one embodiment, the flexible sheet is composed of a thermoplastic polymer film comprising a single polymer layer, optionally wherein the single polymer layer comprises an oriented polymer film or a heat-shrinkable polymer film, a multilayer laminate, optionally wherein the multilayer laminate comprises a barrier layer comprising a metal or polymer, a woven or non-woven thermoplastic polymer fabric, optionally which is porous to air, or a foamed thermoplastic polymer layer comprising opposed unfoamed solid skins of the thermoplastic polymer on opposite sides of a central cellular foam core of the thermoplastic polymer.

According to one embodiment, the molten plastic composition further comprises a physical blowing agent which is a gas dissolved in the thermoplastic polymer, the molten plastic composition being injected at an injection pressure;

wherein during or after the injecting step (d), the injected plastic composition in contact with the first and second cavity-forming surfaces is cooled to form first and second solid skins respectively adjacent to and in contact with the first and second cavity-forming surfaces, wherein in the lattice-forming part at least some of the plastic composition between the first and second solid skins remains molten, whereby the lattice-forming part comprises opposed first and second solid skins on opposite sides of a central core of the molten plastic composition;

wherein between steps (d) and (e) the method further comprises a mould opening step (i) which is carried out before the molten plastic composition between the first and second solid skins has solidified in the lattice-forming part, the mould opening step (i) exposing the molten plastic composition of the lattice-forming part to an external pressure lower than the injection pressure thereby allowing the molten plastic composition between the first and second solid skins of the lattice-forming part to expand by foaming to form an expanded cellular foam as a result of the molten plastic composition beneath the first solid skin expanding away from the second solid skin, wherein the opening step comprises removing the first mould part so that the first solid skin is no longer in contact with the first cavity-forming surface; and wherein in the cooling step (e) the expanded cellular foam is cooled to cause the molten plastic composition between the first and second solid skins of the lattice-forming part to solidify and to form in the sidewall of the container the lattice structure in which the elongate ribs comprise opposed upper and lower unfoamed solid skins of the thermoplastic polymer on opposite sides of a central cellular foam core of the thermoplastic polymer.

According to one embodiment, the first and second mould parts are, respectively, outer and inner mould parts which respectively form outer and inner surfaces of the container, or the first and second mould parts are, respectively, inner and outer mould parts which respectively form inner and outer surfaces of the container.

According to one embodiment, in step (i) in each elongate rib the first solid skin is expanded to form a convexly curved surface, optionally wherein the convexly curved surface is continuously convexly curved between opposite elongate longitudinal edges of the elongate rib.

BRIEF DESCRIPTION OF THE DRAWINGS

Embodiments of the present invention will now be described by way of example only with reference to the accompanying drawings, in which.

Figure 1:
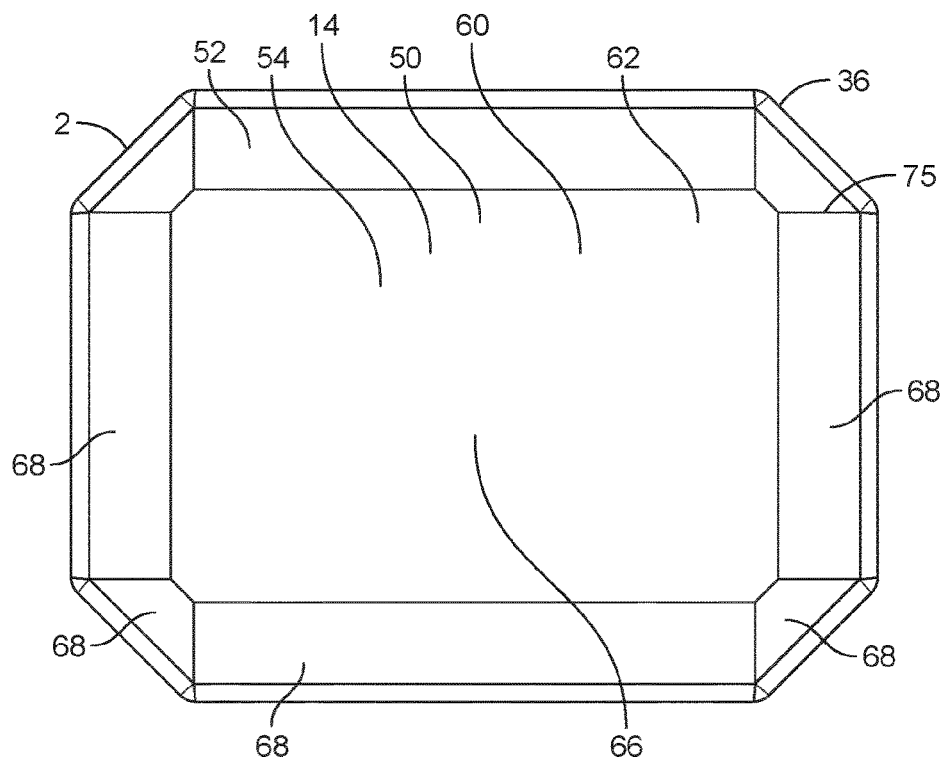
FIG. 1 is a plan view from above of a tray in accordance with a first embodiment of the present invention.
Figure 2:
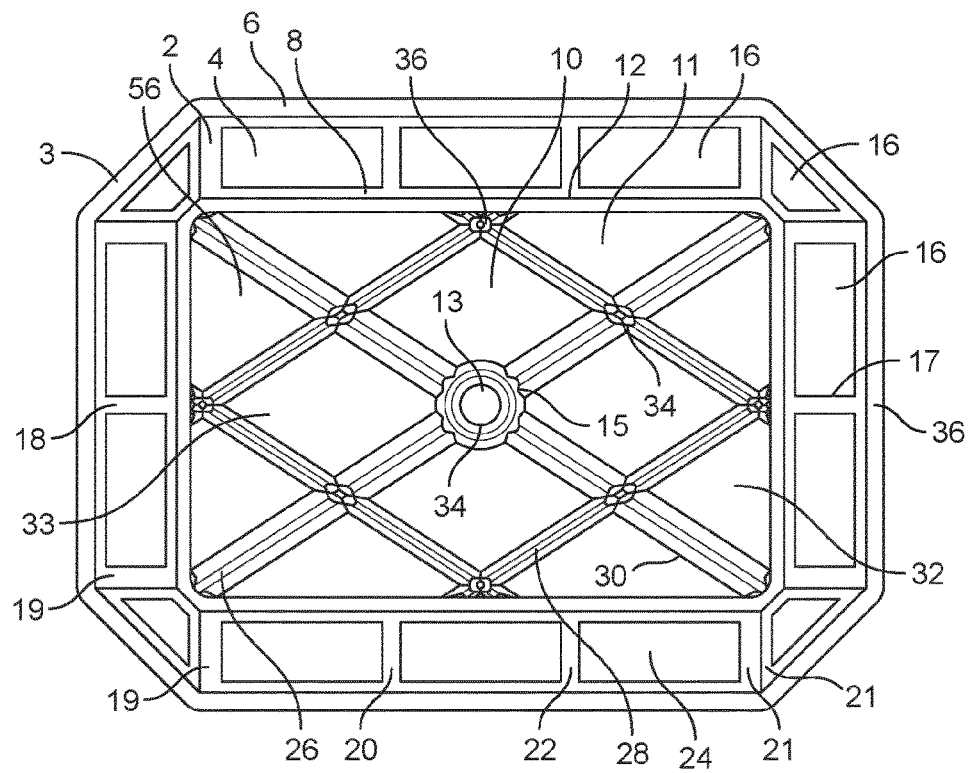
FIG. 2 is a plan view from below of the tray of FIG. 1.
Figure 3:
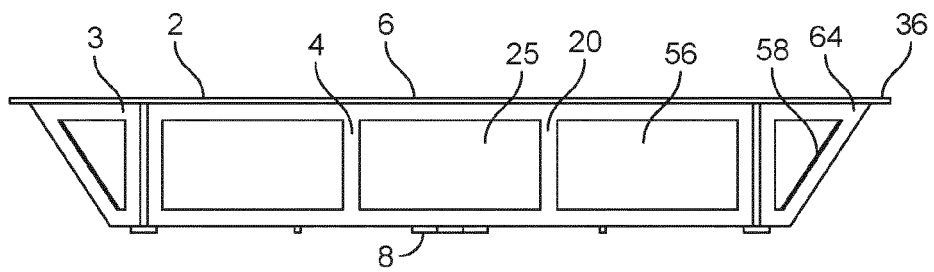
FIG. 3 is a side view of the tray of FIG. 1.
Figure 4:
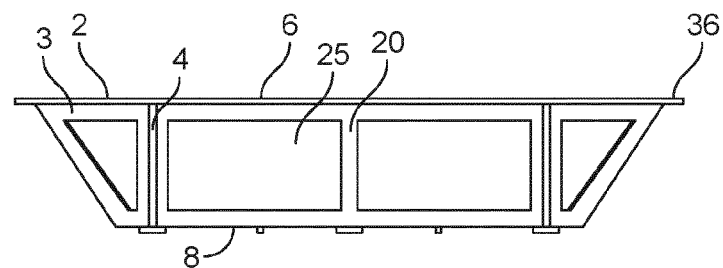
FIG. 4 is an end view of the tray of FIG. 1.

The drawings are highly schematic and not necessarily to scale, and some dimensions may be exaggerated for the purpose of clarity of illustration.

DETAILED DESCRIPTION

Referring to FIGS. 1 to 5, there is shown a container in accordance with a first embodiment of the present invention. In this embodiment, the container is in the form of a tray 2.

The container, i.e. tray, 2 comprises an annular sidewall 4 which comprises upper and lower annular peripheral edges 6, 8, and a base 10 which comprises an annular peripheral edge 12 which is integral with the lower annular peripheral edge 8 of the sidewall 4. The annular peripheral edge 12 of the base 10 surrounds a base wall structure 11 which is integral therewith. The base wall structure 11 comprises at least one injection moulding sprue 13 at a central region 15 of the base wall structure 11. The sidewall 4 and the base 10 are comprised in a single integral moulded body 3 composed of a thermoplastic polymer and define a central concavity 14 for packaging a product, such as a foodstuff (not shown). The single integral moulded body 3 is formed by injection moulding, and the thermoplastic polymer has been injected through the sprue 13 to fill an injection moulding cavity for moulding the single integral moulded body 3 as described hereinbelow.

In the preferred embodiments of the present invention, the thermoplastic polymer may comprise a polyolefin or blend of a plurality of polyolefins, optionally polyethylene or polypropylene; or a polyester, optionally polyethylene terephthalate or polybutylene terephthalate; or polylactic acid. In a particularly preferred embodiment, the polymer comprises polypropylene. Polypropylenes having a Melt Flow Index (MFI) of from 10 to 120 are most particularly preferred. The Melt Flow Index of a polymer can be measured according to ASTM D1238.

In this specification, the term "annular" means "generally ring-like", is not limited to geometrically circular shapes, and encompasses shapes that may be circular or other than circular, for example elliptical, polygonal, etc. In the illustrated embodiment, the tray 2 is polygonal in plan, being substantially rectangular in plan but with angled, or cut-away, corners. However, the tray 2 may have any desired plan shape, which may be any other polygonal shape, for example square, rectangular, triangular, pentangular, hexagonal, etc., or may a curved or rounded shape, for example circular, elliptical, etc.

In this embodiment, the sidewall 4 has a polygonal shape in plan and comprises a plurality of wall elements 16 which are connected in series to form an endless wall member 17 extending upwardly from, and surrounding, the base 10. Each wall element 16 is disposed between respective portions of the upper and lower annular peripheral edges 6, 8. Each wall element 16 is outwardly inclined and planar. However, in other embodiments the wall elements 16 may be vertical, and orthogonal to the base 10, or inwardly or outwardly curved. Essentially, any desired three-dimensional design for the tray 2 may be employed.

The sidewall 4 comprises a lattice structure 18 of elongate ribs 20 interconnecting the upper and lower annular peripheral edges 6, 8. In the illustrated embodiment, the elongate ribs 20 extend between the upper and lower annular peripheral edges 6, 8 of the sidewall 4. The lattice structure 18 is an open framework 22 defining a plurality of sidewall openings 24. The wall elements 16 are connected at respective corner portions 19 of the sidewall 4. Accordingly, the elongate ribs 20 extend between the upper and lower annular peripheral edges 6, 8 of the sidewall 4 and are located between the upwardly oriented corner portions 19 of the sidewall 4. Each corner portion 19 has opposite upwardly oriented edges 21. The elongate ribs 20 in the sidewall 4 extend upwardly along the sidewall 4 and in a plurality of the wall elements 16, typically each of the wall elements 16 extending along the length or width of the endless wall member 17, although optionally not at any wall element 16 located at an angled corner of the endless wall member 17, each wall element 16 a plurality of the elongate ribs 20 are serially located in a mutually spaced configuration along a width of the wall element 20.

The at least one injection moulding sprue 13 is connected to the upper annular peripheral edge 8 of the annular sidewall 4 by the base wall structure 11, the annular peripheral edge 12 of the base 10, the lower annular peripheral edge 8 of the sidewall 4 and the lattice structure 18 of the sidewall 4.

In this embodiment, the base wall structure 11 also comprises a base lattice structure 26 of elongate ribs 28 connected to the annular peripheral edge 12 of the base 10. The base lattice structure 26 is an open framework 30 defining a plurality of base openings 32. In the illustrated embodiment, the elongate ribs 28 intersect with one or more other of the elongate ribs 28 at rib junctions 34 to form an intersecting rib network 36. At least some of the elongate ribs 28 extend radially outwardly from the central region 15 of the base wall structure 11 of the base 10, which comprises a central rib junction 34.

In an alternative embodiment, the lattice structure 18 in the sidewall 4 may additionally be provided with one or more elongate ribs which extend in a circumferential direction around at least a fraction of the annular periphery of the sidewall 4, and/or at least some of the elongate ribs intersect with one or more other of the elongate ribs at rib junctions to form an intersecting rib network. In another alternative embodiment, the base 10 may comprise a solid layer of the thermoplastic polymer and is not provided with a lattice structure.

In the illustrated embodiment, the lattice structure 18 in the sidewall 4 and the lattice structure 26 in the base 10 are polygonal and the openings 24, 32 between the elongate ribs 20, 28 are polygonal. As illustrated, the lattice structures 18 28 are rectangular and the openings 24, 32 between the elongate ribs 20, 28 are rectangular or triangular. However, other shapes of openings may be provided in the sidewall 4 or base 10.

The container further comprises a flexible sheet 50 which is bonded to the lattice structure 18 in the sidewall 4, and when present the lattice structure 26 in the base 10, to cover the sidewall openings 24, and when present the base openings 32, and form a sealed sidewall surface 52, and a sealed base surface 54, of the tray 2.

In the preferred embodiments, at least one or both of the outer surface 56 and the inner surface 60 of the flexible sheet 50 is printed and/or embossed. Such printing and embossing enable the flexible sheet 50 cosmetically to function as a label in the tray 2, as well as structurally functioning to provide the sealed sidewall surface 52, and the sealed base surface 54, of the tray 2.

In the illustrated embodiment, an outer surface 56 of the flexible sheet 50 is bonded to an inner surface 58 of the lattice structure(s) 18, 26. An inner surface 60 of the flexible sheet 50 forms the interior surface 62 of the sidewall 4 and the base 10.

In alternative embodiments of the present invention, the flexible sheet 50 may be bonded to an outer surface 64 of the lattice structure(s) 18, 26. The inner surface 58 of the lattice structure(s) 18, 26 and exposed regions of the inner surface 60 of the flexible sheet 50 within the sidewall and base openings 24, 32 form the interior surface 62 of the sidewall 4 and the base 10.

In the illustrated embodiment, the sidewall 4 and the base 10 comprise or consist of an unfoamed layer of the thermoplastic polymer.

Figure 6:
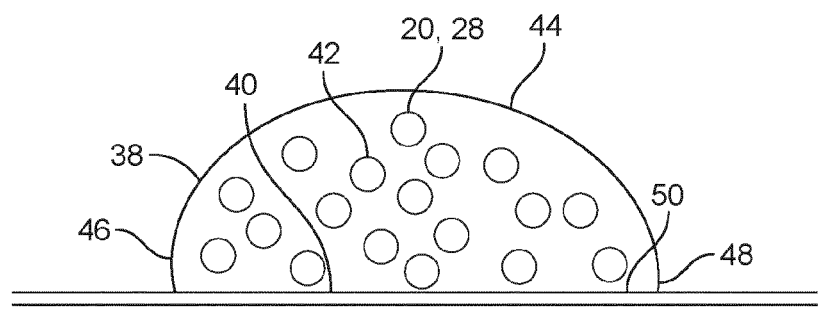
FIG. 6 is an enlarged cross-section through an elongate rib in a sidewall lattice structure of the tray of FIG. 5.
Figure 7:
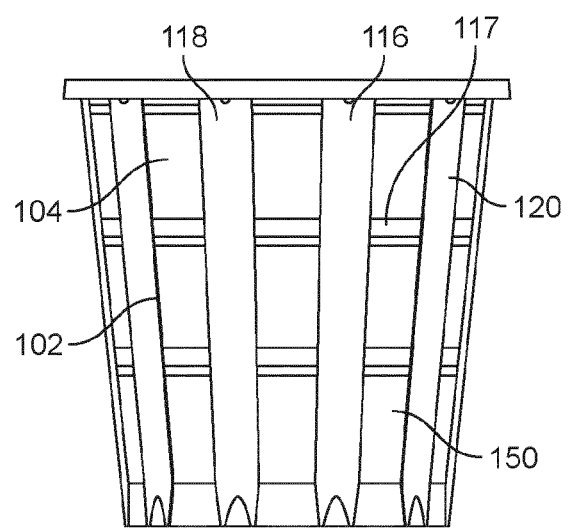
FIG. 7 is a side view of a round pot in accordance with a second embodiment of the present invention.
Figure 8:
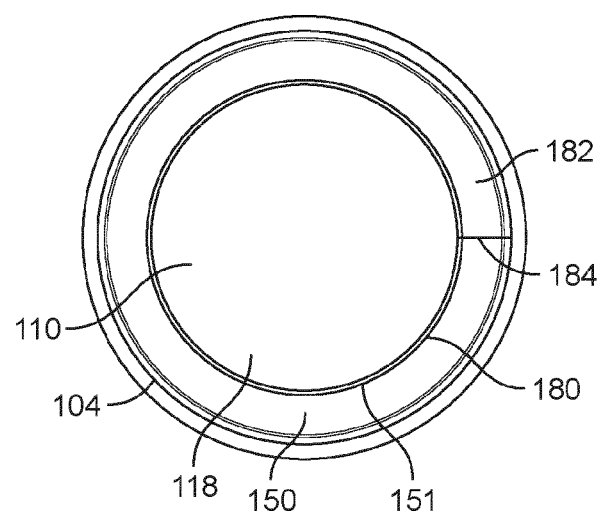
FIG. 8 is a plan view from above of the round pot of FIG. 7.
Figure 9:
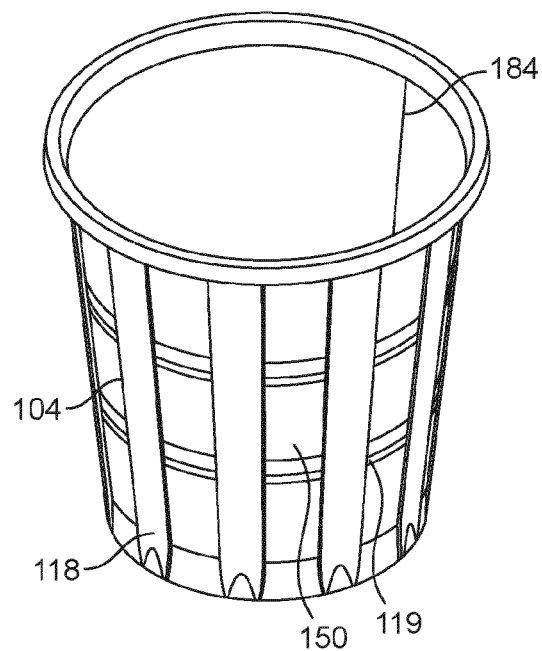
FIG. 9 is a perspective view from above of the round pot of FIG. 7.
Figure 10:
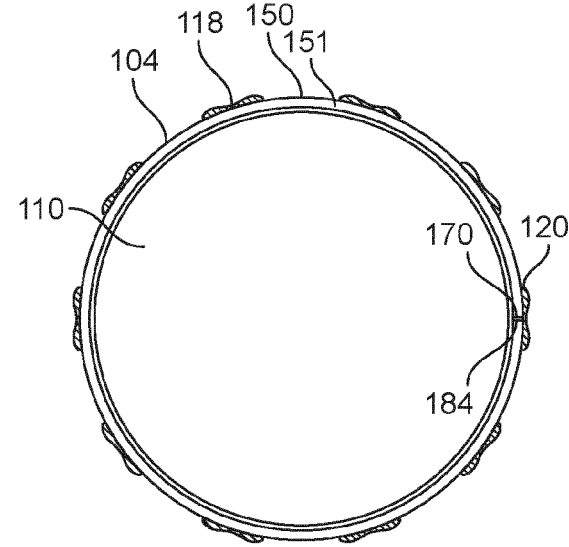
FIG. 10 is an enlarged horizontal cross-section through the plan view of FIG. 8.
Figure 11:
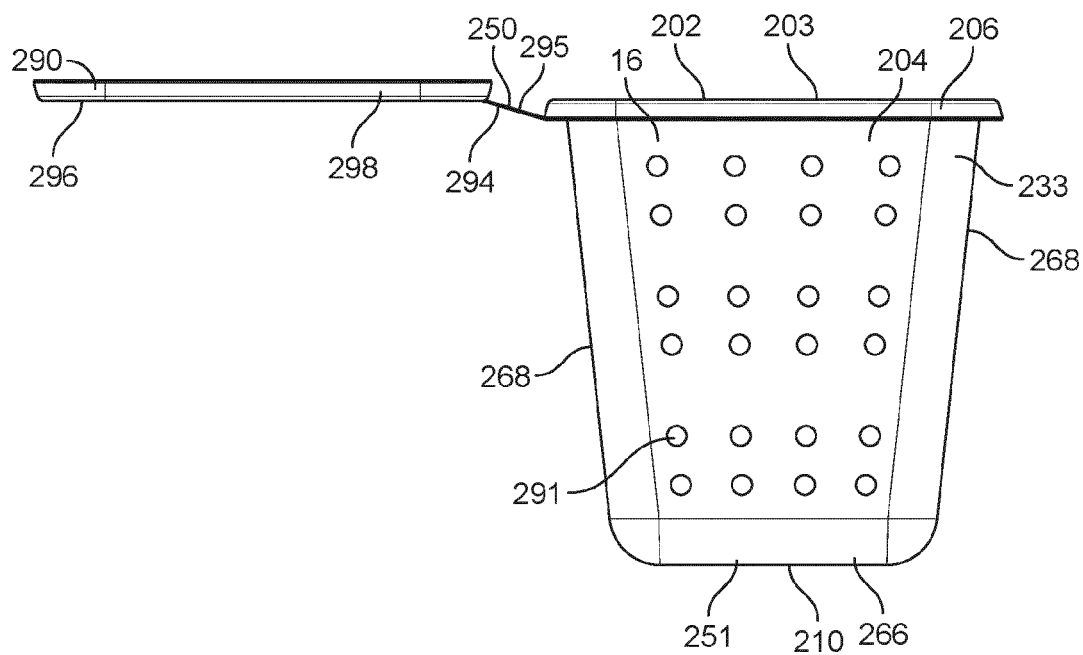
FIG. 11 is a side view of a square pot with a lid in an open configuration in accordance with a third embodiment of the present invention.
Figure 12:
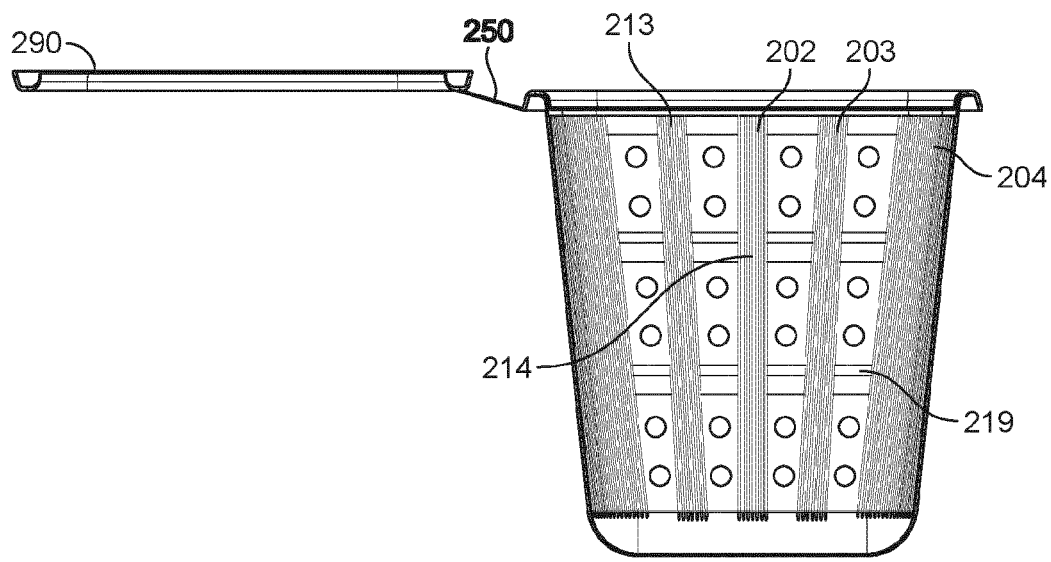
FIG. 12 is a vertical cross-sectional view through the square pot of FIG. 11 with the lid in an open configuration.

In an alternative embodiment, which is illustrated in FIG. 6, in at least one of lattice structures 18, 26 in the sidewall 4 or the base 10 at least some, preferably all, of the respective elongate ribs 20, 28 comprise elongate foam ribs 20, 28. Each foam rib 20, 28 comprises opposed outer and inner unfoamed solid skins 38, 40 of the thermoplastic polymer on opposite sides of a central cellular foam core 42 of the thermoplastic polymer. The inner unfoamed solid skin 40 is bonded to the flexible sheet 50. Typically, in each foam rib 20, 28 at least the outer unfoamed solid skin 38 of the thermoplastic polymer comprises a convexly curved surface 44. Preferably, the convexly curved surface 44 is continuously convexly curved between opposite elongate longitudinal edges 46, 48 of the elongate foam rib 20, 28.

The upper and lower annular peripheral edges 6, 8 of the sidewall 4 may also be comprised of a solid skin/foam core/solid skin structure when foam ribs 20 are provided in the sidewall 4. The annular peripheral edge 12 of the base 10 may also be comprised of a solid skin/foam core/solid skin structure when foam ribs 28 are provided in the base 10. The foam ribs 20, 28 may intersect at foam junctions located within the sidewall 4 or the base 10.

The tray 2 further comprises an upper annular peripheral rim 36 which is integral with the upper annular peripheral edge 6 of the sidewall 4. The rim 36 extends laterally outwardly circumferentially around the tray 2. The rim 36 comprises or consists of an unfoamed layer of the thermoplastic polymer. Typically, when packaging a foodstuff a sealing film (not shown) is sealed to the upper surface of the rim 36.

In an alternative embodiment, which is not illustrated, the upper annular peripheral rim 36 comprises an annular edge of unfoamed thermoplastic polymer reinforced by an integral annular foam hoop reinforcement, wherein the foam hoop reinforcement comprises opposed unfoamed solid skins of the thermoplastic polymer on opposite sides of a central cellular foam core of the thermoplastic polymer.

In the illustrated embodiment, the base 10 has base openings 32. In other embodiments, the base 10 may comprise a solid layer of the thermoplastic polymer and is not provided with a lattice structure 26, in which case the flexible sheet 50 either may be bonded to an inner or outer surface of the base 10, or may not be bonded or even cover the base 10. In other words, in some embodiments the flexible sheet 50 may only cover the sidewall openings 24 and may not cover the base 10 when a solid base is provided.

Figure 5:
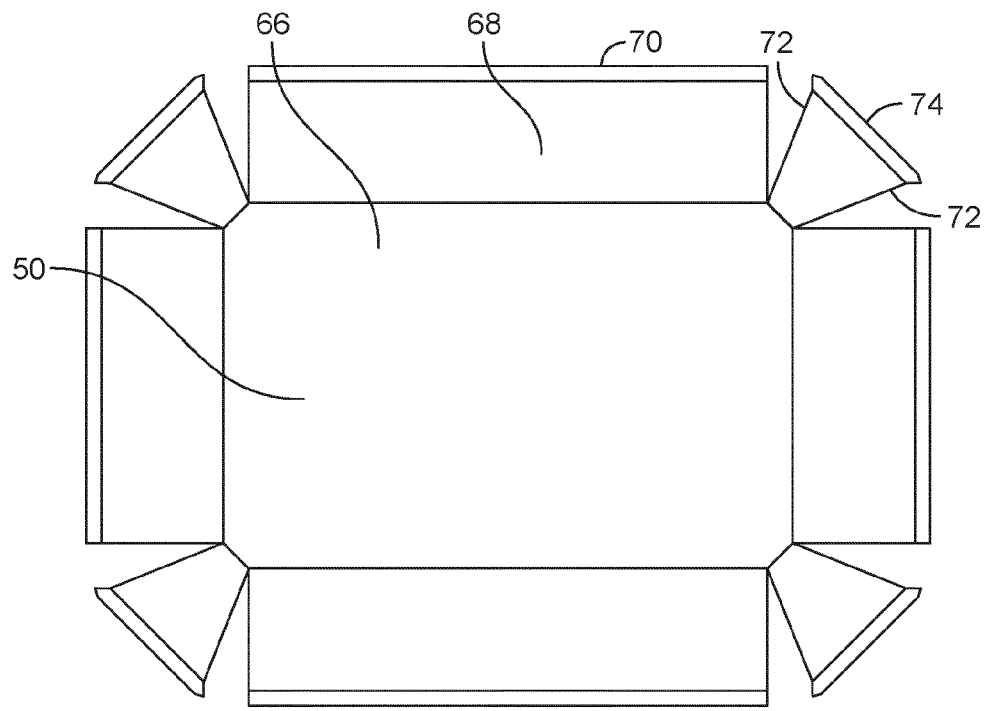
FIG. 5 is a plan view from above of a flexible sheet bonded to a container body to form the tray of FIG. 1.

In the illustrated embodiment, as shown in FIG. 5 the flexible sheet 50 is a single cross-shaped or star-shaped sheet element 51 which has been 2-dimensionally pre-cut to have a shape and dimensions to fit the flexible sheet 50, after bending and/or folding the 2-dimensional sheet element 51 into a 3-dimensional shape, to the single integral moulded body 3 which comprises the sidewall 4 and base 10. The flexible sheet 50 therefore has a base-covering central part 66 and a plurality of sidewall-covering extending parts 68 connected to the central part 66 which extend away from the central part 66, each extending part 68 being configured to cover a respective wall element 16. Each extending part 68 has a peripheral end edge 70 and opposed peripheral side edges 72 which connect the end edge 70 to the central part 66. The peripheral end edges 70 and the peripheral side edges 72 form an entire outer peripheral edge 74 of the flexible sheet 50.

Thereafter the flexible sheet 50 is configured into a 3-dimensional shape which, in the final tray 2, covers the base 10 and extends upwardly to cover the sidewall openings 24. Each sidewall opening 24, and each base opening 32 is covered by a respective portion 25, 33 of the flexible sheet 50. The central part 66 covers the base 10 and the extending parts 68 cover a respective wall element 16 of the sidewall 4.

The outer peripheral edge 74 of the flexible sheet 50 may be bonded to the inner or outer surface of the sidewall 4. However, preferably the outer peripheral edge 74 of the flexible sheet 50 is sealed within the thickness of the sidewall 4 which provides an enhanced sealing bond between the flexible sheet 50 and the moulded body 3. Such a sealing structure means that if the flexible sheet comprises a foam layer, or a recycled polymer layer, the foam or recycled polymer layer is prevented from coming into direct contact with the contents, e.g. foodstuffs, which may be packaged within the container 2.

The peripheral end edges 70 of the flexible sheet 50 are bonded to the upper annular peripheral edge 6 of the sidewall 4. The extending parts 68 are bonded to the lattice structure 18 of the elongate ribs 20 and to the corner portions 19.

At each corner portion 19 of the sidewall 4, each of the opposite upwardly oriented edges 21 of the corner portion 19 has bonded thereto a respective peripheral side edge 72 of the respective opposite extending part 68. At the corner portions 19 the peripheral side edges 72 may abut or overlap. However, it is preferred that at the corner portions 19 the peripheral side edges 72 of the opposite extending parts 68 are spaced from each other by a spacing 75 extending along the corner portion 19.

In the illustrated embodiment, each portion 25, 33 is under tension. This tension may have been formed, as described hereinafter, by providing that the flexible sheet 50 is composed of a heat-shrinkable material and during the bonding of the flexible sheet 50 to the moulded body 3, which comprises the sidewall 4 and base 10, the flexible sheet 50 is heat-shrunk. This heat shrinking step can provide that the flexible sheet 50 is shrunk in dimensions, in at least one shrinkage direction, more than the moulded body 3 during a moulding process in which the flexible sheet 50 is bonded to the moulded body 3 in an in-mould labelling (IML) process.

In alternative embodiments, each portion 25, 33 may be slack and thereby not under tension.

The flexible sheet 50 may be composed of a thermoplastic polymer film comprising a single polymer layer. The single polymer layer may comprise an oriented polymer film or a heat-shrunk polymer film. Alternatively, the flexible sheet 50 may be composed of a multilayer laminate. For example, the multilayer laminate may comprise a barrier layer comprising a metal or polymer. The flexible sheet 50 may alternatively be composed of any suitable sheet material for use in packaging, for example cardboard, metal or metallised plastics material. In other embodiments, the flexible sheet 50 may be composed of a woven or non-woven thermoplastic polymer fabric, preferably which is porous to air. In further embodiments, the flexible sheet 50 may be composed of a foamed thermoplastic polymer layer comprising opposed unfoamed solid skins of the thermoplastic polymer on opposite sides of a central cellular foam core of the thermoplastic polymer. Any of these alternative compositions for the flexible sheet 50 may be used with any structure of the sidewall and base and any shape and configuration of the moulded body 3 and the flexible sheet 50. The selection of any desired composition for the flexible sheet 50 primarily depends upon the end use of the container and the product to be packaged therein.

In a particularly preferred embodiment, the injection moulded body 3 and the flexible sheet 50 are composed on the same thermoplastic polymer so that the entire container, which comprises the flexible sheet 50 bonded to the injection moulded body 3, can be recycled without having to separate the flexible sheet 50 from the injection moulded body 3. For example, the flexible sheet 50 and the injection moulded body 3 can both be composed or a polyolefin, such as polypropylene. Preferably, the polypropylene for the flexible sheet 50 comprises an oriented, preferably biaxially oriented or alternatively uniaxially oriented, polypropylene film, typically having a thickness of from 50 to 200 microns, for example from 75 to 150 microns.

Referring to FIGS. 7 to 10, there is shown a container in accordance with a second embodiment of the present invention. In this embodiment, the container is in the form of a round pot 102.

Again, as for the first embodiment, the round pot 102 has a sidewall 104 and an integral base 110. The sidewall 104 has a lattice structure 118 but the base 110 is solid. In this embodiment, the sidewall 104 has a rotational shape in plan and comprises a single continuously curved endless wall member 116 extending upwardly from the base 110. The elongate ribs 120 in the sidewall 104 extend upwardly along the sidewall 104 and are serially located in a mutually spaced configuration around a circumference of the single continuously curved endless wall member 116. The sidewall is preferably also provided with one or more annular hoop ribs 117 around the sidewall 104 which connect at junctions 119 with the elongate ribs 120.

The flexible 150 sheet is elongate and extends around the sidewall 104. The flexible sheet 150 does not cover the base 110. In particular, the flexible sheet 150 is an elongate strip 151 which is bent to extend circumferentially around the sidewall 104. In this embodiment the flexible sheet 150 is bonded to the inner surface of the lattice structure 118 and forms the interior surface of the sidewall 104. The flexible sheet 150 has opposite ends 180, 182 which form a sealed joint 184 extending between the upper and lower annular peripheral edges 106, 108 of the sidewall 104. The opposite ends 180, 182 are adjacent and are sealingly bonded to the lattice structure 118 to form the sealed joint 184.

As shown in the Figures, the opposite ends 180, 182 are preferably covered by an elongate rib 120 in the sidewall 104 so that the opposite peripheral end edges 170 of the ends 180, 182 are sealed within the thickness of the sidewall 104. Alternatively, the opposite ends 180, 182 overlap and are sealingly bonded to each other to form the sealed joint 184.

Referring to FIGS. 11 to 16, there is shown a container in accordance with a third embodiment of the present invention. In this embodiment, the container is in the form of a square pot 202.

This embodiment is a modification of the round pot of the previous embodiment, and specifically the square pot 202 is not only square in plan, instead of round, but also square pot 202 further comprises a lid 290. The lid 290 is also composed of the thermoplastic polymer used to form the moulded body 203 to form the sidewall 204 and integral base 210 as described for the previous embodiments. The lid 290 is removably fittable to the sidewall 204 and is connected to the sidewall 204 by the flexible sheet 250.

The sidewall 204 and the base 210 each have a respective lattice structure 213, 215. The elongate ribs 214 in the sidewall 204 extend upwardly along the sidewall 204 and are serially located in a mutually spaced configuration around a circumference of sidewall 204. The sidewall 204 is preferably also provided with one or more annular hoop ribs 219 around the sidewall 104 which connect at junctions 119 with the elongate ribs 214. The ribs in the base 210 are radial from a centre of the base 210. As for the lattice structures of the previous embodiments, the sidewall and base lattice structures 213, 215 are open frameworks 221, 223 defining a plurality of sidewall and base openings 225, 227. The flexible sheet 250 is bonded to the sidewall and base lattice structures 213, 215 to cover the sidewall and base openings 225, 227 and form a sealed sidewall surface 229, 231 of the square pot 204. As for the first embodiment, the flexible sheet 250 is a single cross-shaped sheet element 251 which has been 2-dimensionally pre-cut to have a shape and dimensions to fit the flexible sheet 250, after bending and/or folding the 2-dimensional sheet element 251 into a 3-dimensional shape, to the single integral moulded body 203 which comprises the sidewall 204 and base 210. The flexible sheet 250 therefore has a base-covering central part 266 and a plurality of sidewall-covering extending parts 268 connected to the central part 266 which extend away from the central part 266, each extending part 268 being configured to cover a respective wall element 16.

The peripheral end edges 270 of the flexible sheet 250 are bonded to the upper annular peripheral edge 206 of the sidewall 204. The extending parts 268 are bonded to the lattice structure 213 of the sidewall 202 and to the corner portions 233.

Figure 16:
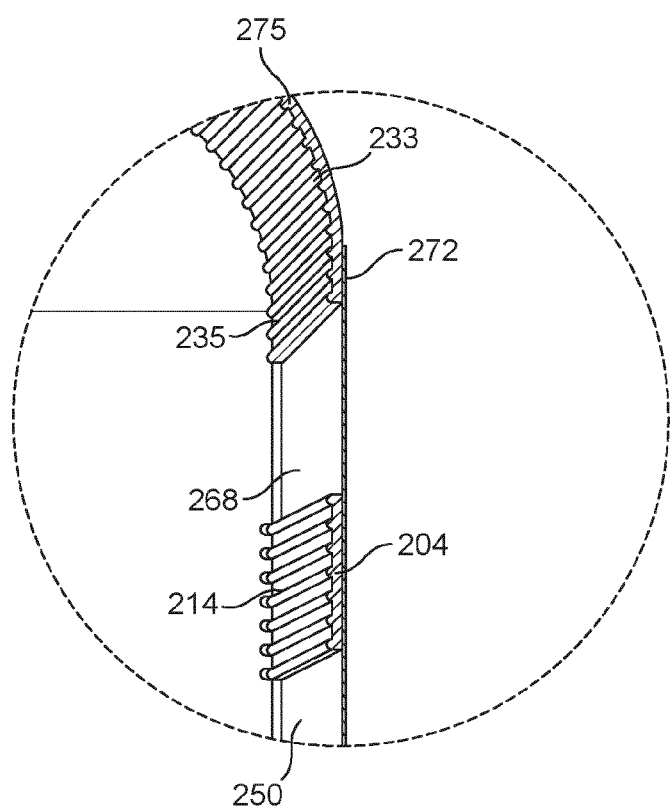
FIG. 16 is a further enlarged detailed plan view from above of a corner of the container of the square pot of FIG. 11, but not showing the lid.

As shown in FIG. 16, at each corner portion 233 of the sidewall 204, each of the opposite upwardly oriented edges 235 of the corner portion 233 has bonded thereto a respective peripheral side edge 272 of the respective opposite extending part 68. At the corner portions 233 the peripheral side edges 272 may abut or overlap. However, it is preferred that at the corner portions 233 the peripheral side edges 272 of the opposite extending parts 268 are spaced from each other by a spacing 275 extending along the corner portion 233. The peripheral side edges 272 are preferably embedded into the corner portions 233 so as to be sealed therein.

The flexible sheet 250 further comprises an integral extension part 294 which is connected to one of the sidewall-covering extending parts 268 of the flexible sheet 250 which is bonded to the sidewall 204. The integral extension part 294 extends away from the sidewall-covering extending part 268 to form a lid portion 296 of the flexible sheet 250 which is bonded to the lid 290, preferably the outer surface 298 of the lid 290.

Figure 13:
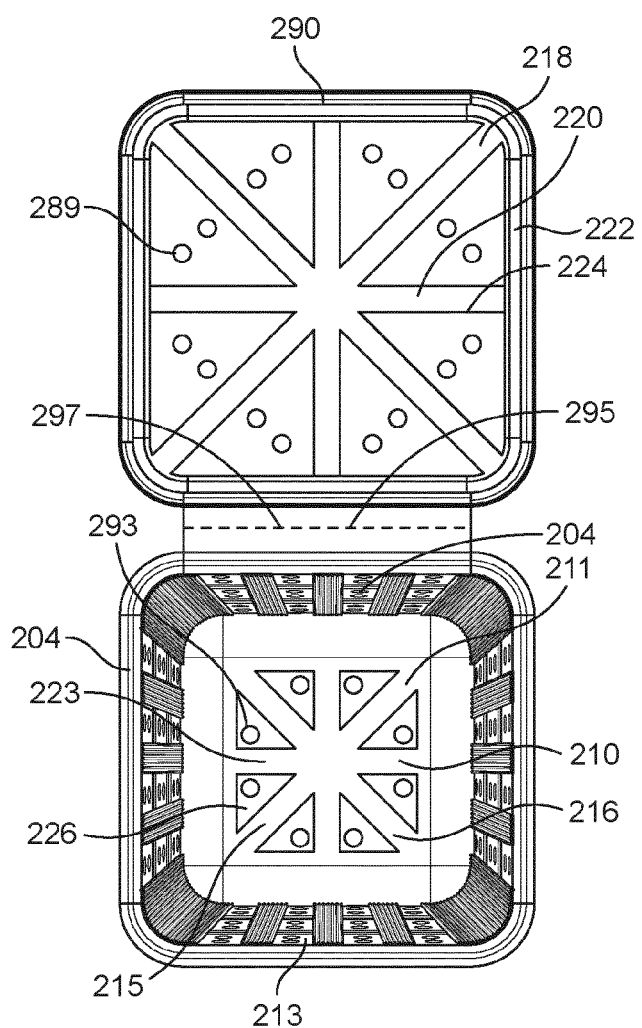
FIG. 13 is a plan view from above of the square pot shown in FIG. 12.
Figure 14:
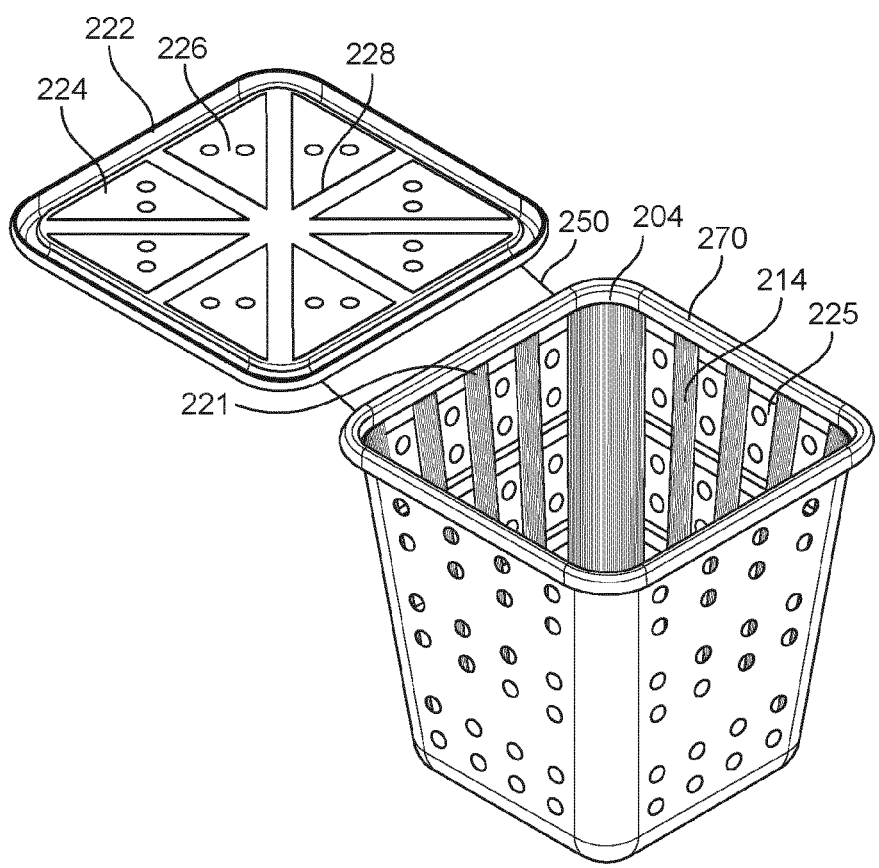
FIG. 14 is a perspective view from above of the square pot shown in FIG. 12.
Figure 15:
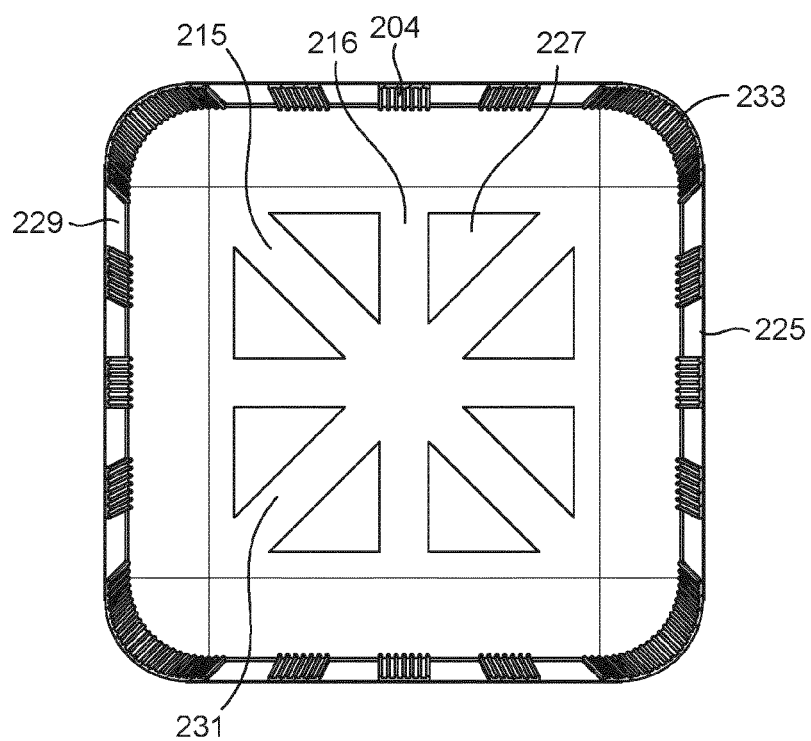
FIG. 15 is an enlarged plan view from above of the container of the square pot of FIG. 11, but not showing the lid.

The integral extension part 294 forms a hinge 295 for the lid 290 and/or a tamper evident connection 297, shown in FIG. 13, between the lid 290 and the sidewall 204. A tamper evident connection 297 can be achieved by perforating the flexible sheet 250 during an earlier step of cutting the peripheral edge of the flexible sheet 250 to provide a tear line which is precisely positioned at the hinge 295 when the flexible sheet 250 is over-moulded. Alternatively, the flexible sheet 250 may extend beyond the lid 290 and include a tear line which is opposite to the hinge 295 when the lid 290 is closed, for example after an extending flap of the flexible sheet 250 has been bonded to the sidewall opposite to the hinge 295.

The lid 290 may be a solid layer of the thermoplastic polymer. However, alternatively, as illustrated, the lid 290 comprises a lid lattice structure 218 of elongate ribs 220 integrally connected to an annular peripheral edge 222 of the lid 290. As for the lattice structures of the previous embodiments, the lid lattice structure 218 is an open framework 224 defining a plurality of lid openings 226. The flexible sheet 250 is bonded to the lid lattice structure 218 to cover the lid openings 226 and form a sealed lid surface 228 of the square pot 204.

The container may be formed as a fresh produce container, e.g. a pot or punnet for berries or mushrooms, or a flower pot, and the container sidewall and/or base and/or lid, and optionally the flexible sheet, may be provided with air passage or drainage holes, as illustrated in FIGS. 11 to 16 by holes 291 in the sidewall 204 aligned with openings 225, holes 293 in the base 210 aligned with openings 227 and holes 289 in the lid 290 aligned with openings 226.

The present invention also provides a method of forming a container, such as any of the containers of the previous embodiments. The flexible sheet can be incorporated into the container as an in-mould label (IML) using IML technology.

Figure 17:
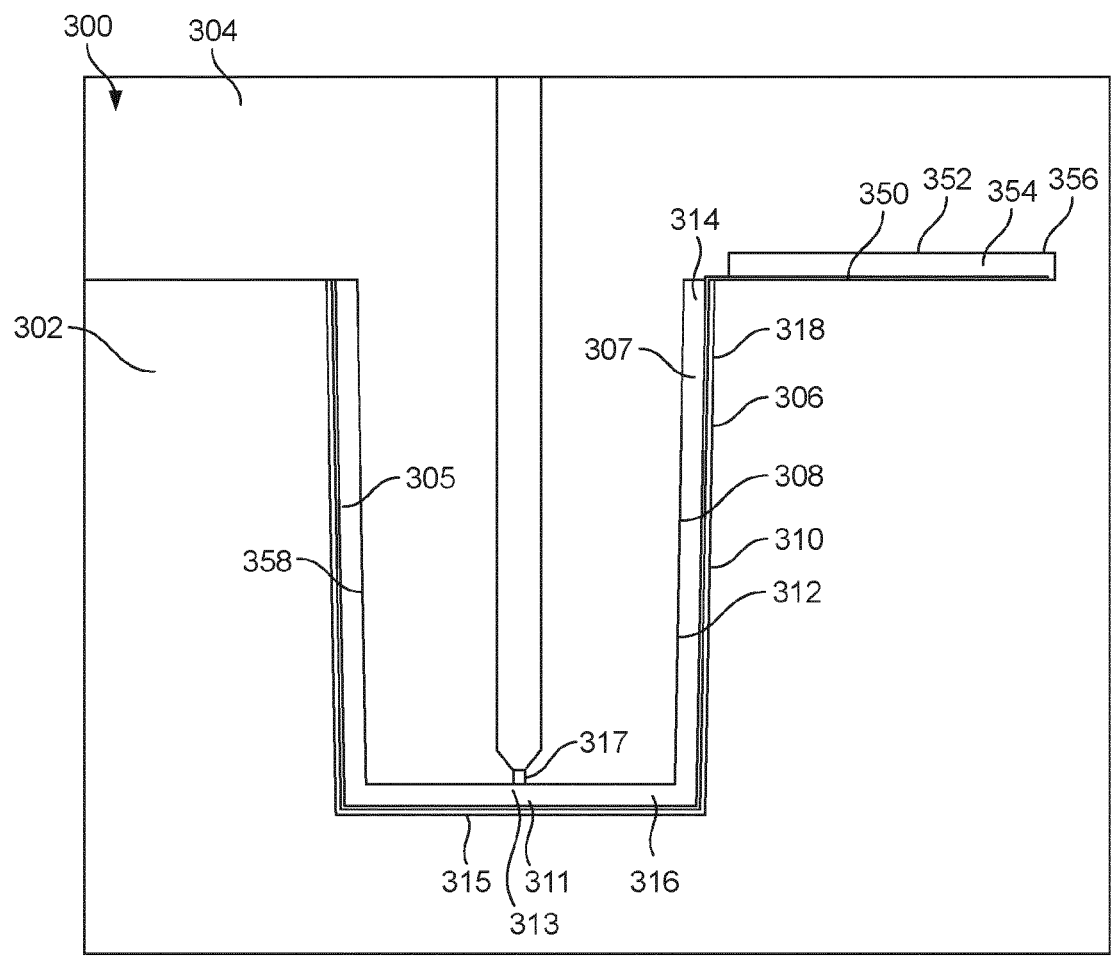
FIG. 17 is an enlarged view illustrating in cross-section the structure of a mould for manufacture of a container in accordance with a fourth embodiment of the present invention.
Figure 18:
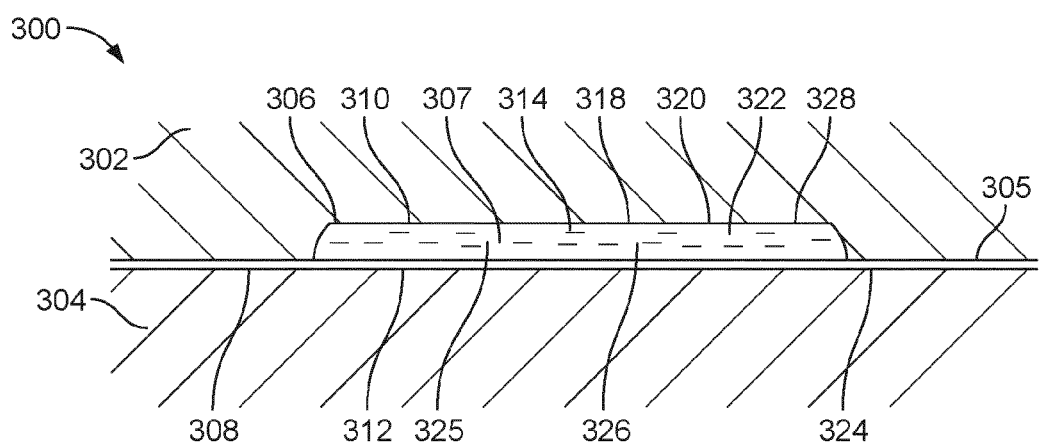
FIG. 18 is an enlarged view illustrating in cross-section the structure of a lattice-forming part and an in-mould label in the form of a flexible sheet in an injection mould cavity between opposed mould parts during manufacture of a container in accordance with a fifth embodiment of the present invention.

Referring to FIGS. 17 to 19, the method provides a mould 300 having a first mould part 302 and a second mould part 304. The first and second mould parts 302, 304 have respective first and second cavity-forming surfaces 306, 308 for forming a sidewall, such as sidewall 4, 104, 204 of the previous embodiments, and a base, such as base 10, 110, 210 of the previous embodiments, of the container which define a central concavity for packaging a product in the container. The first and second cavity-forming surfaces 306, 308 have respective first and second regions 310, 312 for moulding the sidewall of the container.

In the illustrated embodiment, the first and second mould parts 302, 304 are, respectively, outer and inner mould parts for moulding the outer and inner surfaces, respectively, of the container to be moulded.

An in-mould flexible sheet 305, such as flexible sheet 50, 150, 250, is provided between the first and second regions 310, 312.

The mould 300 is then closed, thereby defining a cavity 307 between the first and second cavity-forming surfaces 306, 308. The cavity 307 defines an annular sidewall-forming portion 314 and a base-forming portion 316 which is adjacent to the sidewall-forming portion 314. The first region 310 of the first cavity-forming surface 306 comprises a lattice-forming portion 318, comprising a latticed network 320 of concavities 322 in the first cavity-forming surface 306. Therefore, in the illustrated embodiment, the lattice-forming portion 318 is in the outer mould part, whereas in other embodiments the lattice-forming portion 318 is in the inner mould part.

In one embodiment, the flexible sheet 305 is located within the cavity 307 adjacent to the lattice-forming portion 318 of the first cavity-forming surface 306. In another embodiment, the flexible sheet 305 is located within the cavity 307 adjacent to the second cavity-forming surface 308 at a location opposite the lattice-forming portion 318 of the first cavity-forming surface 306. Again, the lattice-forming portion 318 may be in the inner or outer mould part of the first and second mould parts 302, 304.

A plurality of opening-forming portions 324 of the mould 300 are provided adjacent to the concavities 322. In the opening-forming portions 324 of the mould 300, the flexible sheet 305 is held between the first and second cavity-forming surfaces 306, 308.

The lattice forming portion 318 is in the sidewall-forming portion 314 of the mould 300 to form a sidewall lattice structure, and may also be in the base-forming portion 316 of the mould 300 when a base lattice structure is to be formed.

Thereafter, a molten plastic composition 325 comprising the thermoplastic polymer is injected into the mould 300. This fills the cavity 307 with the molten plastic composition. The sidewall-forming portion 314 of the mould 300 forms a sidewall of the container and the base-forming portion 316 of the mould 300 forms a base of the container, the sidewall and base having structures as described above.

Accordingly, in at least the latticed network 320 of concavities 322 is injected a lattice-forming part 326 of the thermoplastic polymer. The lattice-forming part 326 defines a lattice structure 328, such as the sidewall and optional base lattice structures of the previous embodiments. Each lattice structure is an open framework defining a plurality of sidewall openings formed by the plurality of opening-forming portions 324 of the mould 300. As described above, the base wall structure 311 comprises at least one injection moulding sprue 313 at a central region 315 of the base wall structure 311 through which the molten plastic composition is injected through a gate 317 into the cavity 307. The gate 317 is preferably on the opposite side of the mould cavity 307 from the side which receives the flexible sheet 305, as shown in FIG. 17; however, in an alternative embodiment the molten plastic composition could be injected through a hole in the flexible sheet 305 from a gate which is on the same side of the mould cavity 307 which receives the flexible sheet 305. The at least one injection moulding sprue 313 is connected to the upper annular peripheral edge of the annular sidewall by the base wall structure, the annular peripheral edge of the base, the lower annular peripheral edge of the sidewall and the lattice structure of the sidewall, as described hereinbefore.

Thereafter, the molten plastic composition is cooled to solidify the thermoplastic polymer and bond the flexible sheet 305 to the lattice structure 328 to cover the sidewall openings and form a sealed sidewall surface of the container. The container may then be removed from the mould 300.

Accordingly, the in-mould flexible sheet 305 may be located adjacent to an outer mould part of the first and second mould parts 302, 304 which forms an outer surface of the container, and in the moulded container the flexible sheet 305 is bonded to an outer surface of the lattice structure 328, and the inner surface of the lattice structure 328 and exposed regions of the inner surface of the flexible sheet 305 within the sidewall openings form an interior surface of the sidewall of the container.

Alternatively, the in-mould flexible sheet 300 may be located adjacent to an inner mould part of the first and second mould parts 302, 304 which forms an inner surface of the container, and in the moulded container the flexible sheet 305 is bonded to an inner surface of the lattice structure 328 and an inner surface of the flexible sheet 305 forms the interior surface of the sidewall of the container.

In order to make the round pot container of the second embodiment, the in-mould flexible sheet 305 is an elongate strip, and the flexible sheet is located in the cavity 307 so as to extend circumferentially around the sidewall-forming portion 314 of the mould 300.

As shown in FIG. 17, in order to make the tray container of the first embodiment and the square pot container of the third embodiment, the in-mould flexible sheet 305 is additionally located in the base-forming portion 316 of the cavity 307, and in the molded container the flexible sheet 305 is additionally bonded to a surface of the base.

As described above for the tray container of the first embodiment and the square pot container of the third embodiment, the base of the container may comprise a lattice structure. Accordingly, a base region of the first cavity-forming surface 306 may comprise a base lattice-forming portion, comprising a base latticed network of base concavities in the first cavity-forming surface 306. The flexible sheet 305 is located within the cavity 307 adjacent to the base lattice-forming portion of the first cavity-forming surface or adjacent to the second cavity-forming surface 308 at a location opposite the base lattice-forming portion of the first cavity-forming surface 306. This provides a plurality of base opening-forming portions of the mould 300 adjacent to the base concavities. In the base opening-forming portions of the mould 300, the flexible sheet 305 is held between the first and second cavity-forming surfaces 306, 308. A base lattice-forming part of the molten plastic composition is injected into the base latticed network of base concavities. Accordingly, the base lattice-forming part defines a base lattice structure as described above. The flexible sheet is bonded to the base lattice structure to cover the base openings and form a sealed base surface of the container.

As described above, the flexible sheet 305 may be heat-shrunk during moulding in a heat shrinking step whereby each portion of the heat-shrunk flexible sheet 305 is under tension in the moulded container. The heat shrinking step may be an intrinsic part of the moulding process, so that the heat shrinking occurs when the flexible sheet 305 is exposed to elevated temperatures during moulding. Alternatively, an additional heat shrinking step may be added after the moulded container has been removed from the mould or the mould has been at least partly opened.

As described above for the third embodiment, the container may additionally comprise a lid, and the lid may be affixed to the remainder of the container, comprise the sidewall and base, by an extending part of the flexible sheet.

In order to make such a lid, as shown in FIG. 17, in a further modification of the method of the present invention, the mould further comprises third and fourth cavity-forming surfaces 350, 352 defining a lid-forming cavity 354 for forming a lid of the container. The in-mould flexible sheet 305 extends into the lid-forming cavity 354. The molten plastic composition is injected into the lid-forming cavity 354 by a dedicated gate (not shown) to form a lid 356 composed of the thermoplastic polymer. The lid 356 is hingedly connected to the sidewall 358 by the flexible sheet 305.

As described above, wherein the integral extension part forms a hinge for the lid and/or a tamper evident connection between the lid and the sidewall.

Figure 19A:
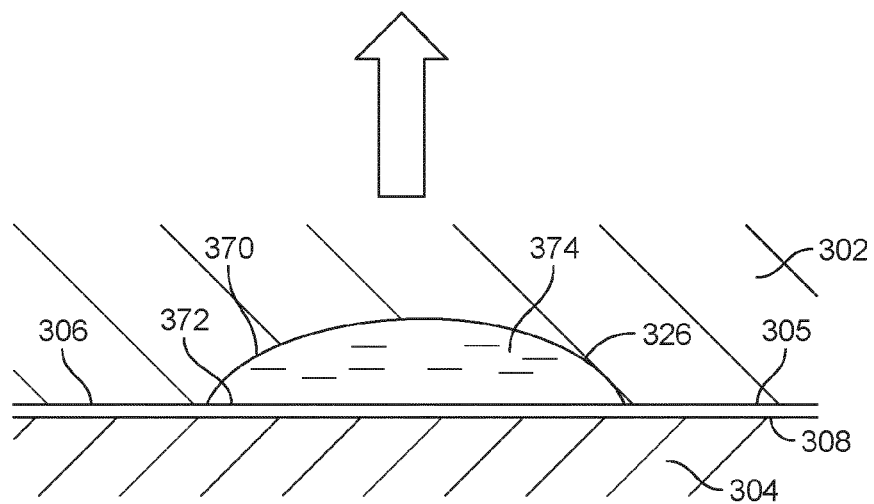
FIGS. 19a and 19b are each an enlarged view, similar to FIG. 18, illustrating in cross-section the structure of a foam rib, and an in-mould label in the form of a flexible sheet, within, respectively, a closed and a subsequently partly-opened injection mould in which one of the opposed mould parts has been moved away from the injection moulded part during manufacture of a container in accordance with a sixth embodiment of the present invention.
Figure 19B:
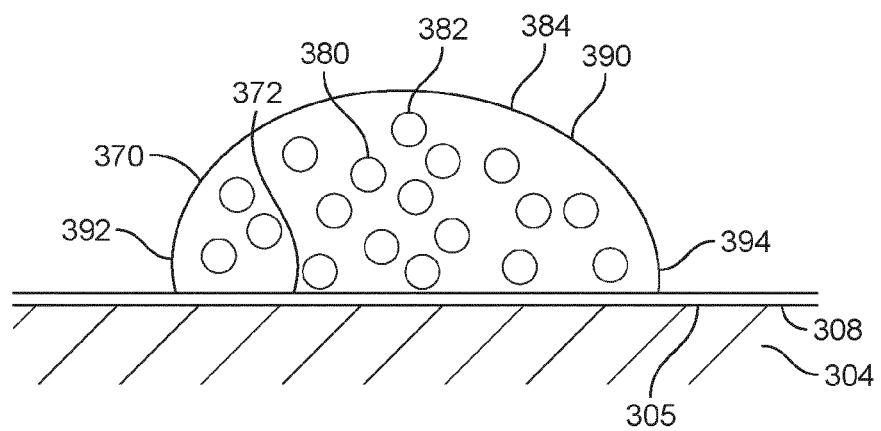

Referring to FIGS. 19a and 19b, as described above, the sidewall 4 and/or the base 10 may comprise foam ribs 20, 28 having a solid skin/foam core/solid skin structure. The foam ribs 20, 28 are bonded to the flexible sheet 305 to close the openings in the lattice structure. The upper and lower annular peripheral edges 6, 8 of the sidewall 4 may also be comprised of a solid skin/foam core/solid skin structure when foam ribs 20 are provided in the sidewall 4. The annular peripheral edge 12 of the base 10 may also be comprised of a solid skin/foam core/solid skin structure when foam ribs 28 are provided in the base 10. The foam ribs 20, 28 may intersect at foam junctions located within the sidewall 4 or the base 10.

In order to produce such a foam core in a lattice structure in the sidewall and/or base, the molten plastic composition further comprises a physical blowing agent which is a gas dissolved in the thermoplastic polymer. During or after the injecting step, in which the molten plastic composition is injected at an injection pressure, as shown in FIG. 19a the injected plastic composition in contact with the first and second cavity-forming surfaces 306, 308 is cooled to form first and second solid skins 370, 372 respectively adjacent to and in contact with the first and second cavity-forming surfaces 306, 308. In the lattice-forming part 326 at least some of the plastic composition between the first and second solid skins 370, 372 remains molten to form a molten core 374. Therefore, the lattice-forming part 326 comprises opposed first and second solid skins 370, 372 on opposite sides of a central core 374 of the molten plastic composition.

After the injecting step and before the final cooling step, the method further comprises a mould opening step as shown in FIG. 19b which is carried out before the molten plastic composition in the core 374 between the first and second solid skins 370, 372 has solidified in the lattice-forming part 326. The first mould part 302 is moved as shown by the arrow in FIG. 19a. The mould opening step exposes the molten plastic composition of the lattice-forming part 326 to an external pressure lower than the injection pressure, for example atmospheric pressure. This pressure differential allows the molten plastic composition between the first and second solid skins of the lattice-forming part 326 to expand by foaming to form an expanded cellular foam 380 as a result of the molten plastic composition beneath the first solid skin 370 expanding away from the second solid skin 372. The expansion occurs because the blowing agent comes out of solution in the molten plastic composition at the reduced pressure and forms gas bubbles.

In the preferred embodiment, the mould opening step comprises removing the first mould part 302, which is preferably the outer mould part, so that the first solid skin is no longer in contact with the first cavity-forming surface 306. This causes the outer first solid skin to expand outwardly. However, the opposite configuration may be employed, and the second mould part 304, which is preferably the inner mould part, is removed so that the second solid skin is no longer in contact with the second cavity-forming surface 308 to cause the inner second solid skin to expand inwardly.

In the final cooling step, the expanded cellular foam is cooled to cause the molten plastic composition between the first and second solid skins 370, 372 of the lattice-forming part 26 to solidify and to form in the sidewall of the container the lattice structure 382 in which the elongate ribs 384 comprise opposed upper and lower unfoamed solid skins 370, 372 of the thermoplastic polymer on opposite sides of a central cellular foam core 380 of the thermoplastic polymer, with the ribs 384 are bonded to the flexible sheet 305. Correspondingly, a lattice structure of foam ribs can be formed in the base and/or lid of the container.

Preferably, in each elongate rib 384 the first solid skin is expanded to form a convexly curved surface 390. The convexly curved surface 390 may be continuously convexly curved between opposite elongate longitudinal edges 392, 394 of the elongate rib 384.

Blowing agents which can be used in the embodiments of the present invention include physical blowing agents in the form of a gas dissolved in the molten plastic composition. Such a gas may comprise, for example, carbon dioxide. The gas may optionally further include a perfume composition (i.e. a scent) which remains present in the polymer material after expansion, to enhance the consumer experience.

When using carbon dioxide as the blowing agent, $CO_2$ gas is produced by the blowing agent in the extruder of the injection moulding machine, and the $CO_2$ gas then goes into solution during the injection phase (typically from 300 to 500 bar within the mould cavity) due to the relatively high pressure exerted on the material being greater than the pressure required (typically greater than 80 bar) to force $CO_2$ into solution within molten thermoplastic resin, such as polypropylene.

The molten plastic composition is injected at an injection pressure $P_{injection}$. Typically, the injection pressure $P_{injection}$ is at least 150 bar. At the end of the injecting step, optionally a packing pressure, $P_{packing}$, is applied to the cavity. Typically, packing pressure P packing is at least 150 bar.

During the injecting step, and any packing, the injection pressure $P_{injection}$, and any packing pressure $P_{packing}$, respectively, are above a minimum pressure threshold, P threshold, in the regions of the cavity to form unfoamed parts of the container. Typically, the minimum pressure threshold $P_{threshold}$ is 80 bar. This prevents the physical blowing agent from coming partly out of solution in the polymer so that cellular gas bubbles are not formed in those regions during the injecting step, and any packing step.

As described above, the base, sidewall and lid of the container are composed of thermoplastic polymer which is preferably injection moulded. The base, sidewall and lid may comprise respective lattice structures which are covered by the flexible sheet which is bonded thereto. The flexible sheet not only seals the lattice structures, and can function as a printed and/or embossed label, and can connect the lid to the remainder of the container and function as a hinge and/or tamper evident device, but also the flexible sheet can enhance the structural strength and integrity of the container.

Typically, any regions of the injection moulded thermoplastic polymer which are composed of a solid, unfoamed, layer of the thermoplastic polymer have a thickness of from 0.25 to 0.75 mm, optionally from 0.25 to 0.5 mm. Such solid, unfoamed regions of the thermoplastic polymer typically appear transparent to the naked eye. Even if a blowing agent is present which has been used to form foamed regions, the blowing agent, in the preferred embodiment $CO_2$ gas, can be under sufficient mould pressure to remain in solution in the polymer, in the preferred embodiment polypropylene, during manufacture of the container until the polymer has solidified throughout its thickness. After the molten polymer has solidified, it is not possible for cells to form as a result of any action of the blowing agent.

In contrast, typically any regions of expanded foam in the injection moulded thermoplastic polymer typically appear translucent to the naked eye because the expanded cellular foam includes cells that have cellular walls that reflect visible light. However, if a pigment is incorporated into the thermoplastic polymer at a high concentration, the expanded foam regions may typically appear opaque, with a solid colour. In contrast, the unexpanded regions have no cells, or if any cells are present, for example at a low concentration, they have a cell size of typically less than 0.5 microns and therefore are not visible to the naked eye, and consequently the unexpanded regions appear transparent to the naked eye.

In the lattice forming part, prior to opening the mould to cause expansion of the central molten polymer layer between the opposite solid skins, the rib-forming parts typically have a thickness of from 0.5 to 1.5 mm, optionally from 0.75 to 1.25 mm. In the final moulded container, the expanded foam ribs typically have a thickness of from 1 to 3 mm, optionally from 1.5 to 2.5 mm. Typically, rib-forming parts have increased in thickness by from 0.5 to 1.5 mm to form the expanded foam ribs.

In some embodiments of the present invention, the mechanical properties and dimensions of the in-mould flexible sheet can be selected to control the stretch ratio of any expanded foam regions in the container to which the in-mould flexible sheet is bonded. In this way, the in-mould flexible sheet can function to control the shape, dimensions and properties of the resultant container.

The present invention provides a container having a lattice structure in the sidewall, and optionally in the base and/or lid. The lattice structure defines openings which are sealed by the flexible sheet which is bonded to the sidewall, and optionally the base and/or lid. Typically, the surface area of a surface of the lattice structure is less than 75% of the surface area of the associated wall, base or lid in which the lattice structure is provided. The provision of openings between ribs reduces the weight of, and thermoplastic material in, the container. However, the combination of the ribs and the flexible sheet bonded thereto provides a high strength structure for the container sidewalls, and optionally also for the base and/or lid. The container can be manufactured using an injection moulding apparatus having an in-mould labelling (IML) capability.

The configuration of the base and sidewall, in particular with respect to the injection moulding sprue in the base, enables containers of a wide variety of shapes and dimensions to be manufactured reliably using an injection moulding method and apparatus. The provision of the lattice structure(s) comprising elongate ribs enables rapid, controlled and reliable molten material flow from the sprue throughout the injection moulding cavity. Weak points of convergence can readily be avoided by the provision of the elongate ribs, and by selecting the rib dimensions and rib spacing, which enhance uniform material flow from the base, up the sidewall and to the rim. The reduced surface area of the lattice structure as compared to a continuous solid wall enables the clamp pressure of the injection moulding apparatus to be reduced.

In the method of the invention, the flexible sheet is bonded to the injection moulded container body, and optionally the lid, using an in-mould labelling (IML) technique, so that the bond between the flexible sheet and the injection moulded container is achieved by fusing the solidified thermoplastic polymer to the surface of the flexible sheet. However, the container of the invention can alternatively be manufactured by another method, in which the injection moulded container body, and optionally the lid, are formed independently of the flexible sheet, i.e. without using an in-mould labelling (IML) technique, to produce a bare skeleton of the injection moulded container body, and optionally separately the lid. Thereafter, the flexible sheet can be bonded to the injection moulded container, and optionally the lid, by bonding the separate flexible sheet to the surface of the injection moulded container body, and optionally the lid, to form any of the container structures of the various embodiments described hereinbefore. In this modification of the manufacturing method, the flexible sheet can be bonded to the injection moulded container body, and optionally the lid, by an adhesive layer. For example, the flexible sheet can be self-adhesive, with an inner surface of the flexible sheet being coated with a pressure-sensitive, hot melt or thermally activated adhesive. Typically, the adhesive would be provided in a pattern which corresponded to the lattice pattern and other surface patterns in the container body and lid to which the flexible sheet is to be adhered.

In the preferred embodiments of the present invention, the container may be designed or configured to package foodstuffs, but the container may be used for any purpose. The container may have heat resistance and may be suitable for warming foodstuff in an oven or microwave oven. The container may be disposable or reusable, and in either case is recyclable since the container is preferably composed of a single polymer, for example polypropylene.

Various modifications to the illustrated embodiments will be apparent to those skilled in the art and are intended to be included within the scope of the present invention as defined by the appended claims.

The invention claimed is:

1. A container comprising an annular sidewall which comprises upper and lower annular peripheral edges and a lattice structure of elongate ribs interconnecting the upper and lower annular peripheral edges, wherein the lattice structure is an open framework defining a plurality of sidewall openings, and a base which comprises an annular peripheral edge which is integral with the lower annular peripheral edge of the sidewall, the annular peripheral edge of the base surrounding a base wall structure which is integral therewith, the base wall structure comprising at least one injection moulding sprue at a central region of the base wall structure, wherein the at least one injection moulding sprue is connected to the upper annular peripheral edge of the annular sidewall by the base wall structure, the annular peripheral edge of the base, the lower annular peripheral edge of the sidewall and the lattice structure of the sidewall, wherein the sidewall and the base are composed of a thermoplastic polymer and define a central concavity for packaging a product, wherein in the lattice structure in the sidewall at least some of the elongate ribs comprise elongate foam ribs, wherein each foam rib comprises opposed outer and inner unfoamed solid skins of the thermoplastic polymer on opposite sides of a central cellular foam core of the thermoplastic polymer, and wherein the container further comprises a flexible sheet which is bonded to the lattice structure to cover the sidewall openings and form a sealed sidewall surface of the container.

2. The container of claim 1 wherein the flexible sheet is bonded to an inner surface of the lattice structure and an inner surface of the flexible sheet forms the interior surface of the sidewall or wherein the flexible sheet is bonded to an outer surface of the lattice structure and the inner surface of the lattice structure and exposed regions of the inner surface of the flexible sheet within the sidewall openings form the interior surface of the sidewall.

3. The container of claim 1 wherein the flexible sheet is an elongate strip which extends circumferentially around the sidewall and has opposite ends which form a sealed joint extending between the upper and lower annular peripheral edges.

4. The container of claim 3 wherein the opposite ends are adjacent and are sealingly bonded to the lattice structure to form the sealed joint, or overlap and are sealingly bonded to each other to form the sealed joint.

5. The container of claim 1 wherein the flexible sheet is additionally bonded to a surface of the base.

6. The container of claim 5 wherein the flexible sheet is a single flexible sheet which covers the base and extends upwardly to cover the sidewall openings.

7. The container of claim 5 wherein the base wall structure comprises a base lattice structure of elongate ribs connected to the annular peripheral edge of the base, wherein the base lattice structure is an open framework defining a plurality of base openings, and wherein the flexible sheet is bonded to the base lattice structure to cover the base openings and form a sealed base surface of the container.

8. The container of claim 7 wherein in the lattice structure in the base at least some of the elongate ribs extend radially outwardly from a centre of the base.

9. The container of claim 7 wherein in the lattice structures in the base at least some of the elongate ribs comprise elongate foam ribs, wherein each foam rib comprises opposed outer and inner unfoamed solid skins of the thermoplastic polymer on opposite sides of a central cellular foam core of the thermoplastic polymer.

10. The container of claim 9 wherein in each foam rib the outer unfoamed solid skin of the thermoplastic polymer comprises a convexly curved surface.

11. The container of claim 10 wherein the convexly curved surface is continuously convexly curved between opposite elongate longitudinal edges of the elongate foam rib.

12. The container of claim 1 wherein each opening is covered by a respective portion of the flexible sheet, each portion being slack and thereby not under tension.

13. The container of claim 1 wherein the flexible sheet has an outer peripheral edge which is sealed within a thickness of the sidewall or base.

14. The container of claim 1 wherein the sidewall has a polygonal shape in plan and comprises a plurality of wall elements which are connected in series to form an endless wall member extending upwardly from the base, wherein elongate ribs in the sidewall extend upwardly along the sidewall and in a plurality of the wall elements a plurality of the elongate ribs are serially located in a mutually spaced configuration along a width of the wall element, and the flexible sheet comprises a central part which covers the base and a plurality of extending parts which extend away from the central part, each extending part covering a respective wall element.

15. The container of claim 14 wherein at least two of the wall elements are connected at a respective corner portion of the sidewall which extends upwardly from the base, the corner portion having opposite upwardly oriented edges, and each of the opposite upwardly oriented edges has bonded thereto a peripheral side edge of a respective opposite extending part of the flexible sheet.

16. The container of claim 15 wherein at the respective corner portion the peripheral side edges of the opposite extending parts of the flexible sheet are spaced from each other by a spacing extending along the corner portion.

17. The container of claim 1 wherein the flexible sheet is composed of a thermoplastic polymer film comprising a single polymer layer, optionally wherein the single polymer layer comprises an oriented polymer film or a heat-shrunk polymer film, a multilayer laminate, optionally wherein the multilayer laminate comprises a barrier layer comprising a metal or polymer, a woven or non-woven thermoplastic polymer fabric, optionally which is porous to air, or a foamed thermoplastic polymer layer comprising opposed unfoamed solid skins of the thermoplastic polymer on opposite sides of a central cellular foam core of the thermoplastic polymer.

18. The container of claim 1 wherein at least one or both of an outer surface and an inner surface of the flexible sheet is printed and/or embossed.

19. The container of claim 1 wherein in the lattice structure in the sidewall at least some of the elongate ribs extend between the upper and lower annular peripheral edges of the sidewall.

20. The container of claim 19 wherein in the lattice structure in the sidewall at least some of the elongate ribs extending between the upper and lower annular peripheral edges of the sidewall are located between upwardly oriented corners of the sidewall.

21. The container of claim 1 wherein in the lattice structure in the sidewall at least some of the elongate ribs extend in a circumferential direction around at least a fraction of the annular periphery of the sidewall.

22. The container of claim 1 wherein in at least one of lattice structures in the sidewall, the base or the lid at least some of the elongate ribs intersect with one or more other of the elongate ribs at rib junctions to form an intersecting rib network.

23. The container of claim 1 wherein the or each lattice structure is polygonal and the openings between the ribs are polygonal, optionally wherein the lattice structure is rectangular and the openings between the ribs are rectangular or triangular.

24. The container of claim 1 wherein the flexible sheet comprises holes which are aligned with the openings in the, at least one of, or each lattice structure to provide air passage or drainage holes in the sidewall, base or lid.

25. The container of claim 1 which further comprises an upper annular peripheral rim which is integral with the upper annular peripheral edge of the sidewall and comprises or consists of an unfoamed layer of the thermoplastic polymer.

26. The container of claim 25 wherein the upper annular peripheral rim comprises an annular edge of unfoamed thermoplastic polymer reinforced by an integral annular foam hoop reinforcement, wherein the foam hoop reinforcement comprises opposed unfoamed solid skins of the thermoplastic polymer on opposite sides of a central cellular foam core of the thermoplastic polymer.

* * * * *